(12) United States Patent
Nishio et al.

(10) Patent No.: US 7,178,155 B2
(45) Date of Patent: Feb. 13, 2007

(54) RECORDING MEDIUM APPARATUS CAPABLE OF LOADING AND UNLOADING A PLURALITY OF TYPES OF RECORDING MEDIA

(75) Inventors: Atsushi Nishio, Tama (JP); Takashi Kawasaki, Tama (JP); Satoru Karahashi, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 516 days.

(21) Appl. No.: 10/789,495

(22) Filed: Feb. 27, 2004

(65) Prior Publication Data

US 2004/0190388 A1  Sep. 30, 2004

(30) Foreign Application Priority Data

Mar. 27, 2003  (JP) .............................. 2003-088705
Mar. 27, 2003  (JP) .............................. 2003-088706

(51) Int. Cl.
*G11B 17/03* (2006.01)

(52) U.S. Cl. ...................................... 720/633; 720/639

(58) Field of Classification Search ................ 720/633, 720/639, 630, 632, 636, 637, 641, 656, 657; 360/99.06, 99.07
See application file for complete search history.

(56) References Cited

U.S. PATENT DOCUMENTS

| | | | | |
|---|---|---|---|---|
| 5,077,722 | A | * | 12/1991 | Geist et al. .................. 720/657 |
| 5,122,914 | A | * | 6/1992 | Hanson .................... 360/98.01 |
| RE34,369 | E | * | 9/1993 | Darden et al. .............. 439/377 |
| 5,495,586 | A | * | 2/1996 | Adachi et al. .............. 710/100 |

* cited by examiner

*Primary Examiner*—Julie Anne Watko
(74) *Attorney, Agent, or Firm*—Ladas & Parry LLP

(57) ABSTRACT

A recording medium apparatus capable of loading a plurality of types of recording media is disclosed. The recording medium apparatus is operable for loading a recording medium having a terminal at a front edge side thereof with respect to an insertion direction and a common dimension part configured to have a predefined dimension at a side opposite to the insertion direction. The recording medium apparatus mechanically and electrically loads and unloads the recording medium based on the common dimension part regardless of different insertion directional lengths of the various recording media.

8 Claims, 28 Drawing Sheets

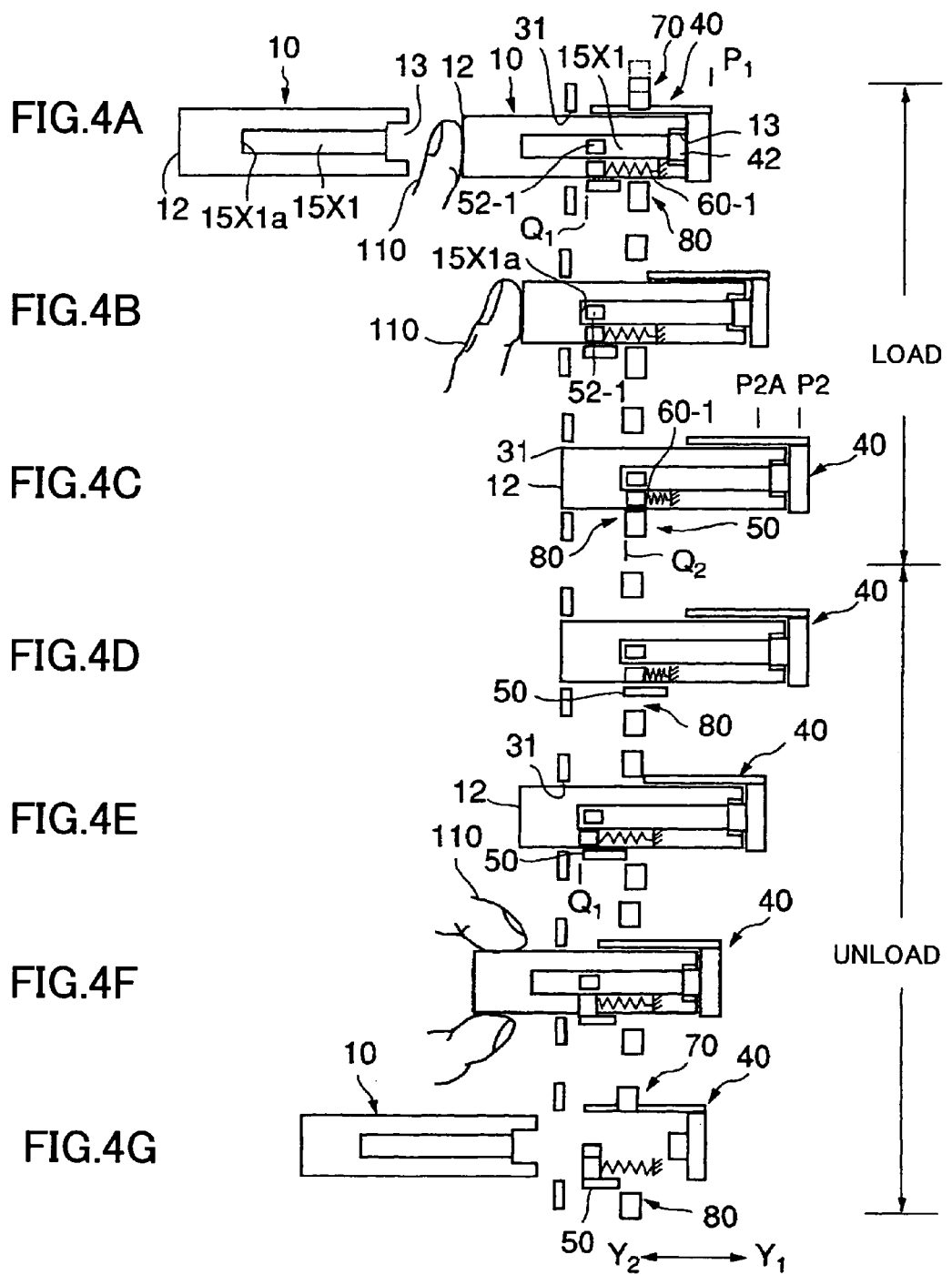

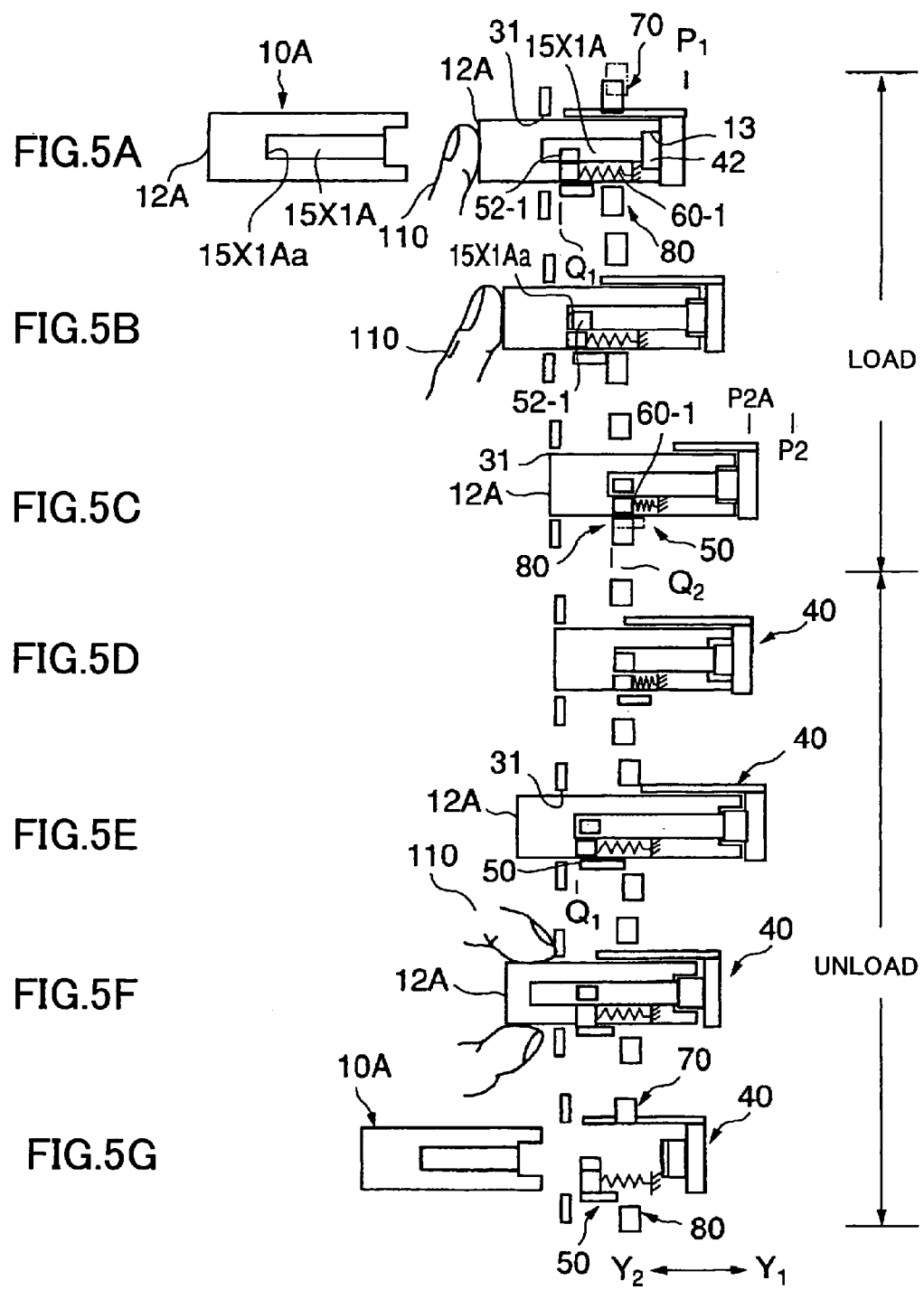

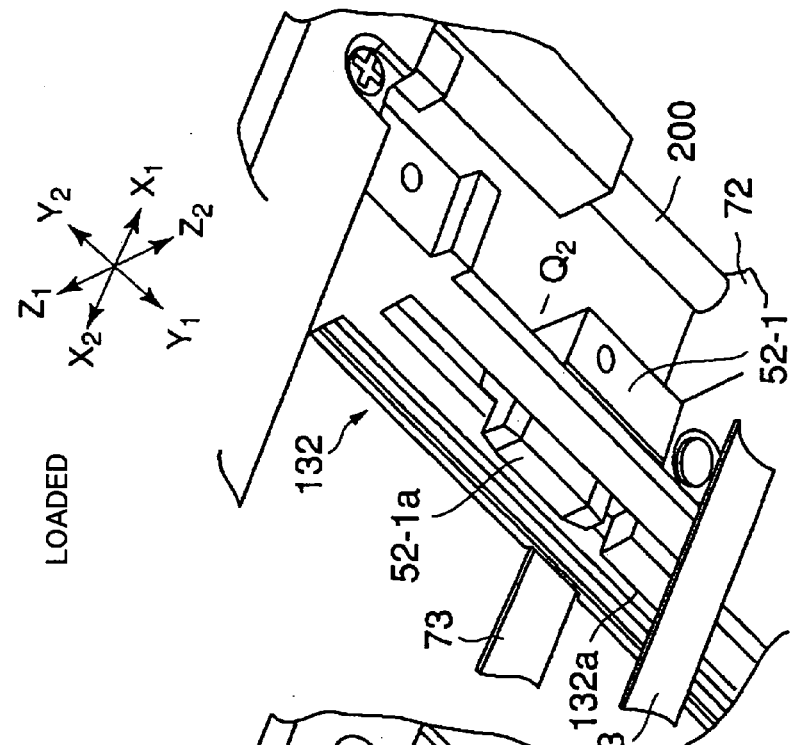
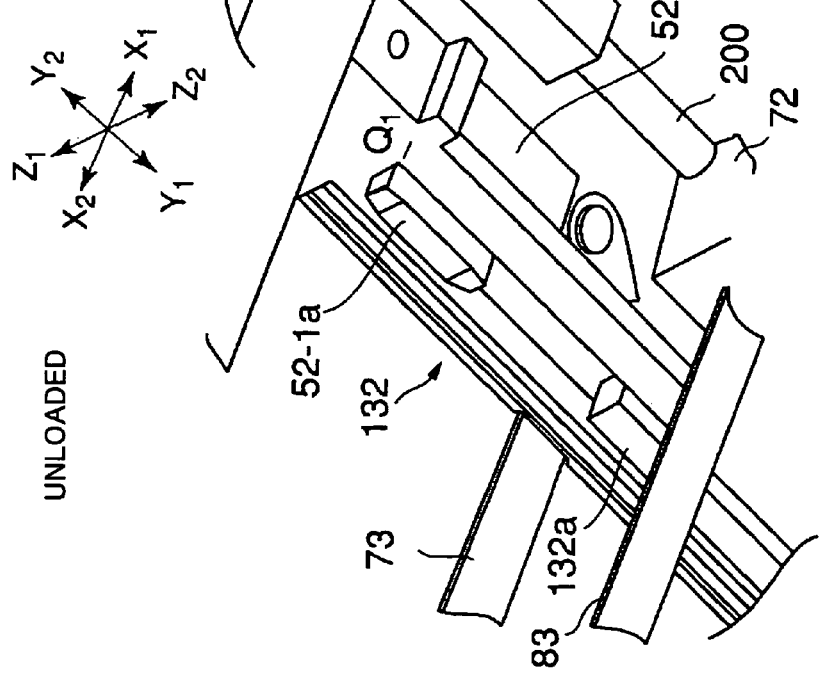

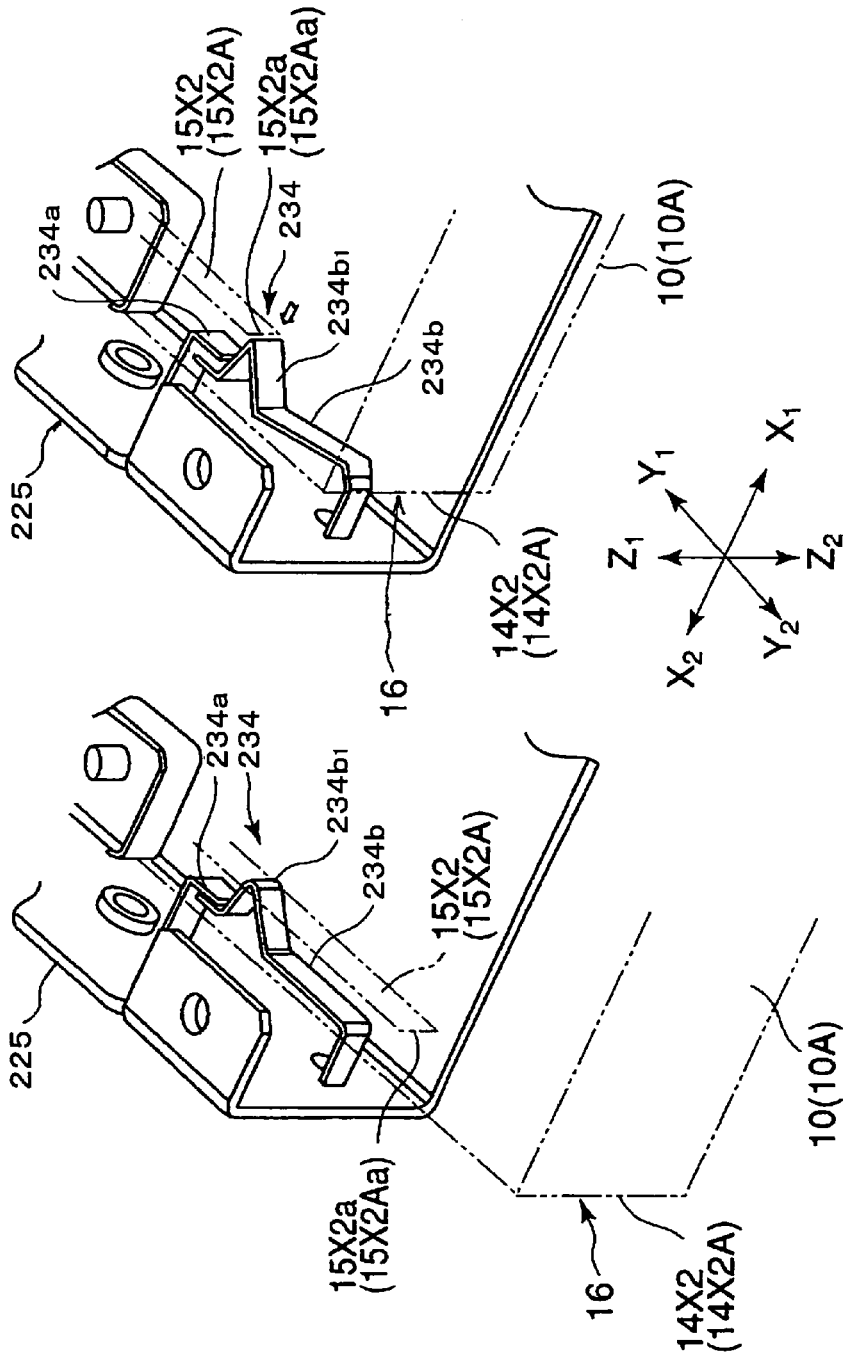

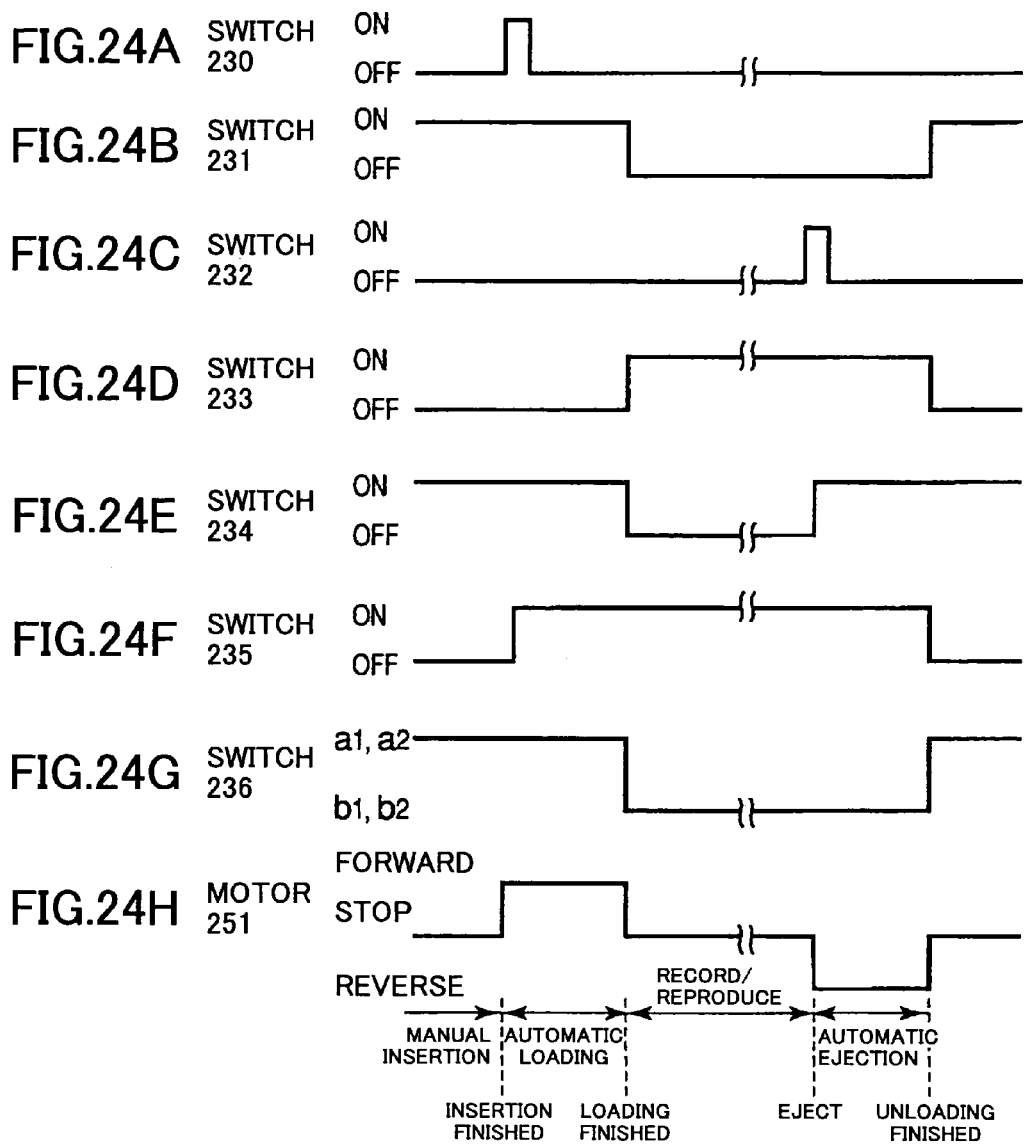

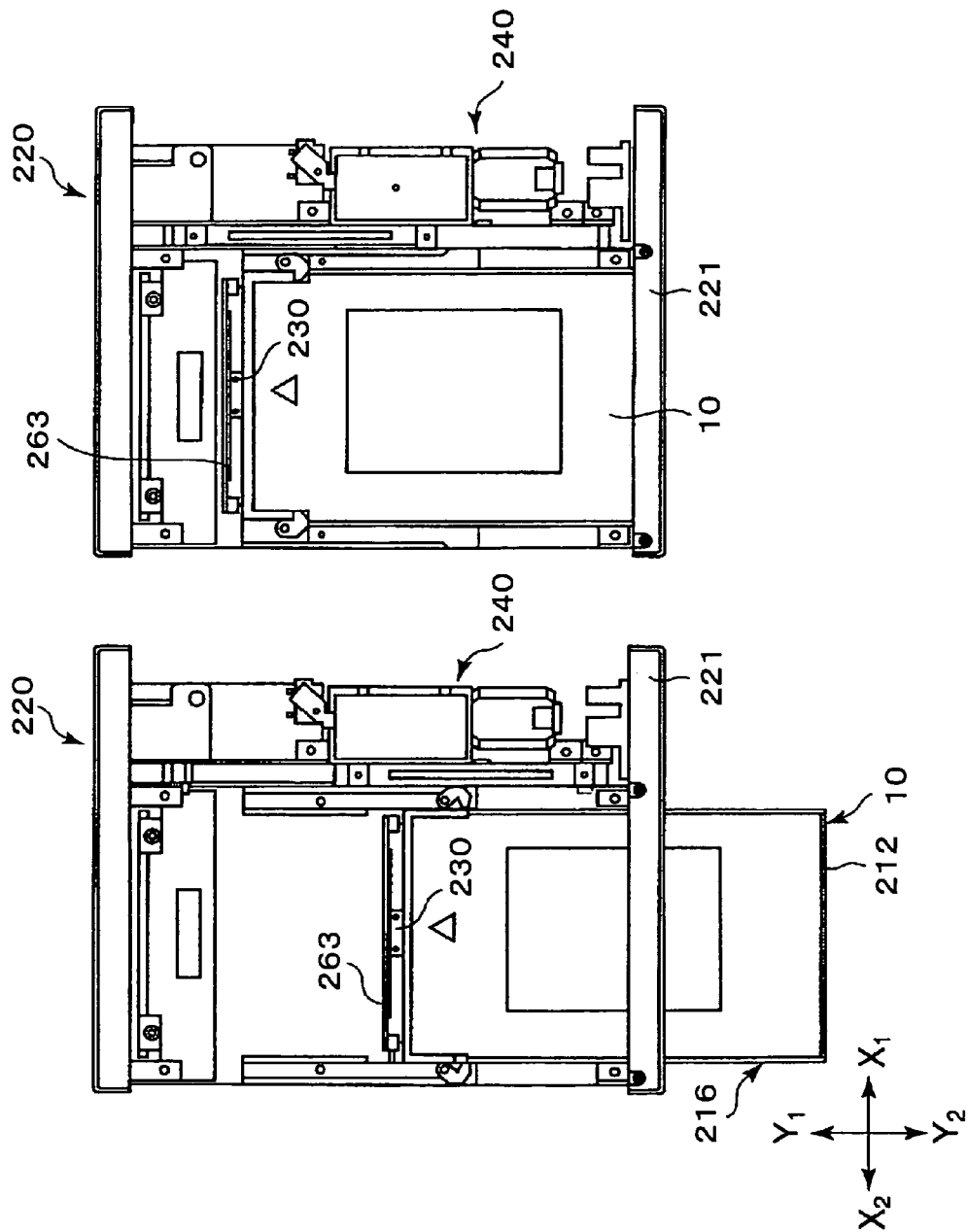

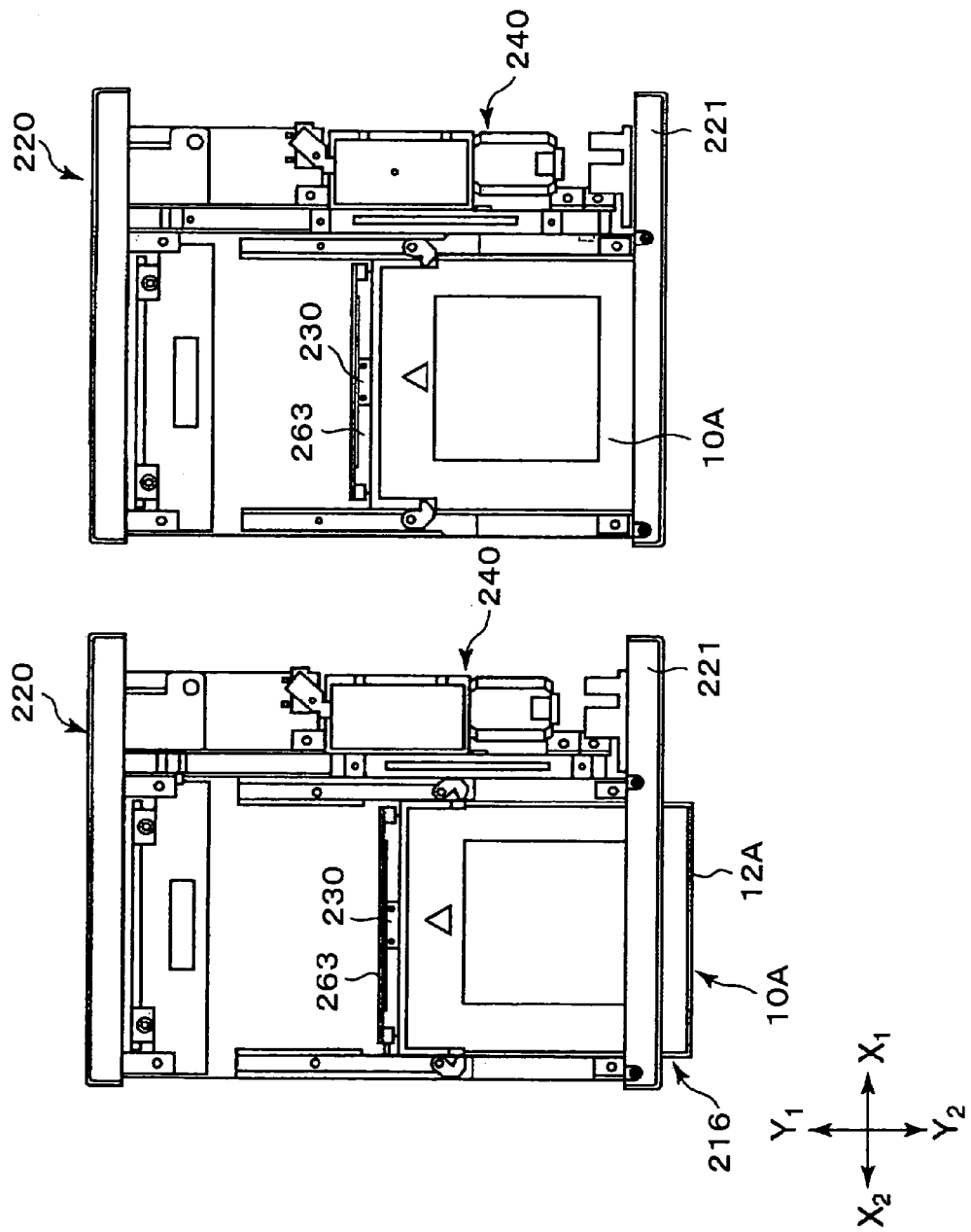

RECORDING MEDIUM APPARATUS CAPABLE OF LOADING AND UNLOADING A PLURALITY OF TYPES OF RECORDING MEDIA

BACKGROUND OF THE INVENTION

1. Field of the Invention

The present invention relates to a recording medium apparatus, and more particularly to a recording medium apparatus for loading and unloading a plurality of types of recording media having a predefined common dimension part.

2. Description of the Related Art

Conventional recording medium apparatuses can handle only one type of recording medium. In other words, conventional recording medium apparatuses are not configured to accept recording media other than such a specified type of recording medium.

In the past, only one type of recording medium was available to each recording medium apparatus. In recent years, however, various types of recording media having different recording capacities have been developed depending on various purposes. In such a case, newly presented recording media are often designed to partially have the same shape as the previous type of recording medium.

Thus, if a user wants to use several types of recording media, the user conventionally has to prepare a plurality of recording medium apparatuses corresponding to the types of recording media because each of the conventional recording medium apparatuses is specialized to one medium type as mentioned above. In this case, such a considerable burden is imposed on the user, which defers popularization of various recording media.

SUMMARY OF THE INVENTION

It is a general object of the present invention to provide a recording medium apparatus in which one or more of the above-mentioned problems are eliminated.

A more specific object of the present invention is to provide a recording medium apparatus that can handle several types of recording media having different lengths with respect to the insertion direction.

In order to achieve the above-mentioned objects, there is provided according to one aspect of the present invention a recording medium apparatus for loading a recording medium having a terminal at a front edge side thereof with respect to an insertion direction wherein the recording medium is loaded by inserting the recording medium toward a loading position under a status where the terminal is connected to a connector of the recording medium apparatus, including: a slider connector unit having the connector, said slider connector unit being shifted by pushing of the recording medium; a slider unit, when the recording medium reaches a predefined position within the recording medium apparatus, being pushed and shifted by a portion of the recording medium, said portion being at a side opposite to the insertion direction; a slider connector unit lock part locking the slider connector unit, said slider connector unit lock part, when the terminal of the recording medium is connected to the connector, unlocking the slider connector unit; a slider unit lock part locking the shifted slider unit, said slider unit lock part, in response to an eject operation, unlocking the slider unit; and a spring member being elastically deformed by shifting of the slider unit, thereby said spring member applying an ejection force to the recording medium via the slider unit.

Additionally, there is provided according to another aspect of the present invention a recording medium apparatus for loading a plurality of types of recording media wherein each of the recording media has a terminal at a front edge side thereof with respect to an insertion direction and a common dimension part configured to have an equal dimension at a side opposite to the insertion direction, and the recording medium is loaded by inserting the recording medium toward a loading position under a status where the terminal is connected to a connector of the recording medium apparatus, including: a lock part locking the recording medium at the loading position, said lock part, in response to an eject operation, unlocking the recording medium, wherein the lock part operates based on the common dimension part.

In an embodiment of the present invention, each of the plurality of types of recording media may include a guide groove formed on a side surface thereof, the guide groove extending from the front edge side with respect to the insertion direction to a position opposite to the insertion direction, the common dimension part may be positioned at an end portion of the guide groove, and the lock part may be activated by the end portion of the guide groove.

In an embodiment of the present invention, the recording medium apparatus may further include a spring member being elastically deformed by inserting of each of the plurality of types of recording media toward the loading position thereof, thereby the spring member applying an ejection force to the recording medium.

According to one aspect of the present invention, it is possible to provide a recording medium apparatus that can mechanically and manually load and unload a plurality of type of recording media having different lengths with respect to the insertion direction thereof.

Additionally, there is provided according to another aspect of the present invention a recording medium apparatus for loading a recording medium having a terminal at a front edge side thereof with respect to an insertion direction, including: a connector connectable to the terminal of the recording medium; a recording medium load part shifting and loading the recording medium connected to the connector by using a motor; and an operation stop part, when a portion opposite to an insertion direction of the recording medium reaches a predefined position regardless of a length of the recording medium with respect to the insertion direction, stopping an operation of the recording medium load part.

Additionally, there is provided according to another aspect of the present invention a recording medium apparatus for loading a plurality of types of recording media wherein each of the recording media has a terminal at a front edge side thereof with respect to an insertion direction and a common dimension part configured to have an equal dimension at a side opposite to the insertion direction, including: a connector connectable to the terminal of the recording medium; a recording medium load part shifting and loading the recording medium connected to the connector by using a motor; and an operation stop part detecting the common dimension part of the recording medium and stopping an operation of the recording medium load part.

In an embodiment of the present invention, the operation stop part may be a switch operable in response to pushing of the common dimension part of the recording medium.

In an embodiment of the present invention, each of the plurality of types of recording media may include a guide groove formed on a side surface thereof, the guide groove extending from the front edge side with respect to the insertion direction to a position opposite to the insertion direction, the common dimension part may be positioned at an end side of the guide groove, the operation stop part may be configured as a switch including a movable contact part engaged with the guide groove, and the switch may not be pushed during engagement with the guide groove and be operated in response to pushing of an end part of the guide groove.

According to one aspect of the present invention, it is possible to provide a recording medium apparatus that can electrically and automatically load and unload a plurality of type of recording media having different lengths with respect to the insertion direction thereof.

Other objects, features and advantages of the present invention will become more apparent from the following detailed description when read in conjunction with the accompanying drawings.

BRIEF DESCRIPTION OF THE DRAWINGS

FIGS. 4A through 4G are diagrams to explain exemplary load and unload operations to load and unload the recording medium shown in FIGS. 1A and 1B;

FIGS. 5A through 5G are diagrams to explain exemplary load and unload operations to load and unload the recording medium shown in FIGS. 1C and 1D;

FIGS. 8A and 8B shows exemplary guide rail pieces of the recording medium apparatus in FIG. 6;

FIGS. 23A and 23B are diagrams illustrating an insert stop switch according to the second embodiment;

FIGS. 24A through 24H are diagrams illustrating statuses of switches and a motor according to the second embodiment;

FIGS. 27A and 27B are diagrams illustrating the recording medium shown in FIGS. 1A and 1B and the recording medium apparatus before and after a load operation, respectively; and FIGS. 28A and 28B are diagrams illustrating the recording medium shown in FIGS. 1C and 1D and the recording medium apparatus before and after a load operation, respectively.

DETAILED DESCRIPTION OF THE PREFERRED EMBODIMENTS

In the following, embodiments of the present invention will be described with reference to the accompanying drawings.

At the beginning, recording media 10 and 10A available for a recording medium apparatus according to embodiments of the present invention are described with reference to FIGS. 1A through 1D.

Figure 1A:
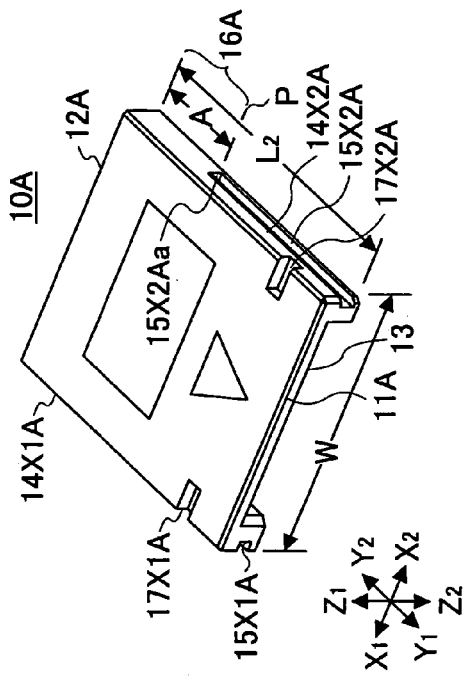
FIGS. 1A and 1B show a first type of recording medium that a recording medium apparatus according to one embodiment of the present invention can handle.
Figure 1B:
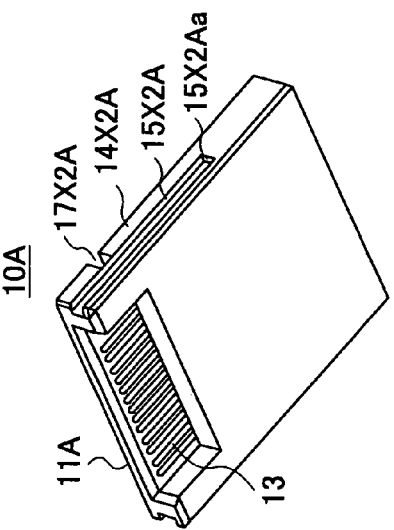
Figure 1C:
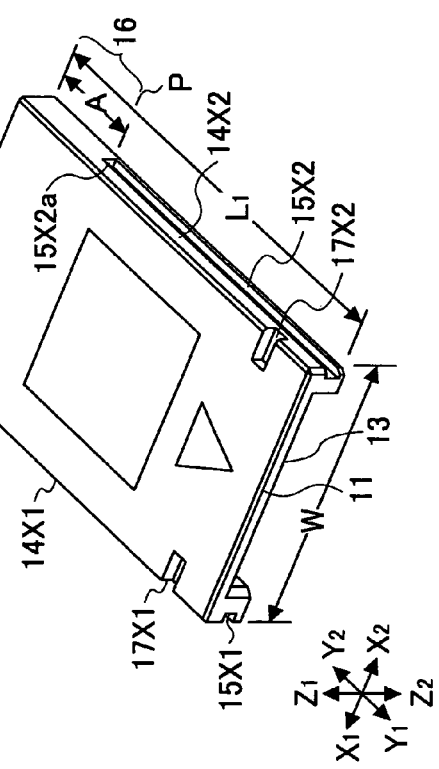
FIGS. 1C and 1D show a second type of recording medium that the recording medium apparatus can handle.
Figure 1D:
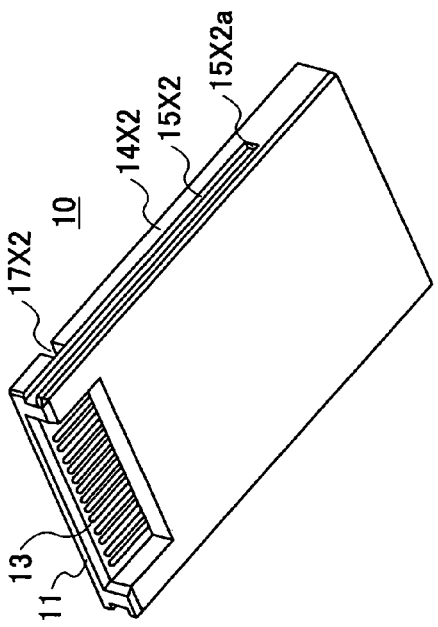

FIGS. 1A and 1B show a first type of recording medium, a recording medium 10, that a recording medium apparatus according to one embodiment of the present invention can handle. FIGS. 1C and 1D show a second type of recording medium, a recording medium 10A, that the recording medium apparatus can handle.

Referring to FIGS. 1A through 1D, both of the recording media 10 and 10A are cartridge-type recording media and have rectangular plate-shaped bodies. The recording media 10 and 10A are configured to accommodate means for recording information therein. The recording medium 10 has a recording capacity greater than the recording medium 10A. The recording media 10 and 10A include front edges 11 and 11A with respect to an insertion direction, in which the recording media 10 and 10A are inserted in the recording medium apparatus, and base parts 12 and 12A, respectively, as illustrated in FIGS. 1A and 1C. Each of the recording media 10 and 10A includes a connector part 13 similarly configured to have a terminal at the side of the front edges 11 and 11A. The recording media 10 and 10A are formed to have the same width W and different lengths, and specifically the recording media 10 and 10A are configured such that the length L1 of the recording medium 10 is greater than the length L2 of the recording medium 10A. On side surfaces 14X1 and 14X2 of the recording medium 10, respective guide grooves 15X1 and 15X2 are formed between the front edge 11 and a position P along the $Y_1Y_2$ aixs, as illustrated in FIG. 1A. Similarly, on side surfaces 14X1A and 14X2A of the recording medium 10A, respective guide grooves 15X1A and 15X2A are formed between the front edge 11A and the position P along the $Y_1Y_2$ axis, as illustrated in FIG. 1C. In the recording media 10 and 10A, the position P is determined to have the same distance A from the base part 12 and 12A. In other words, end parts 15X2a and 15X2Aa of the guide grooves 15X2 and 15X2A are positioned equally away from the base parts 12 and 12A, respectively. Also, illustrated side surface portions 16 and 16A, which are areas corresponding to the distance A, of the side surfaces 14X1, 14X2, 14X1A and 14X2A have the same shape. According to this embodiment, these side surface portions 16 and 16A are made use of. In addition, the recording medium 10 includes concave parts 17X1 and 17X2 on the side surfaces 14X1 and 14X2, respectively, in the vicinity of the front edge 11. Similarly, the recording medium 10A includes concave parts 17X1A and 17X2A on the side surfaces 14X1A and 14X2A, respectively, in the vicinity of the front edge 11A.

A recording medium apparatus according to a first embodiment of the present invention is described.

A rough description is given, with reference to FIG. 2 through FIG. 5, of structure and operation of a recording medium apparatus 20 according to the first embodiment.

Figure 2:
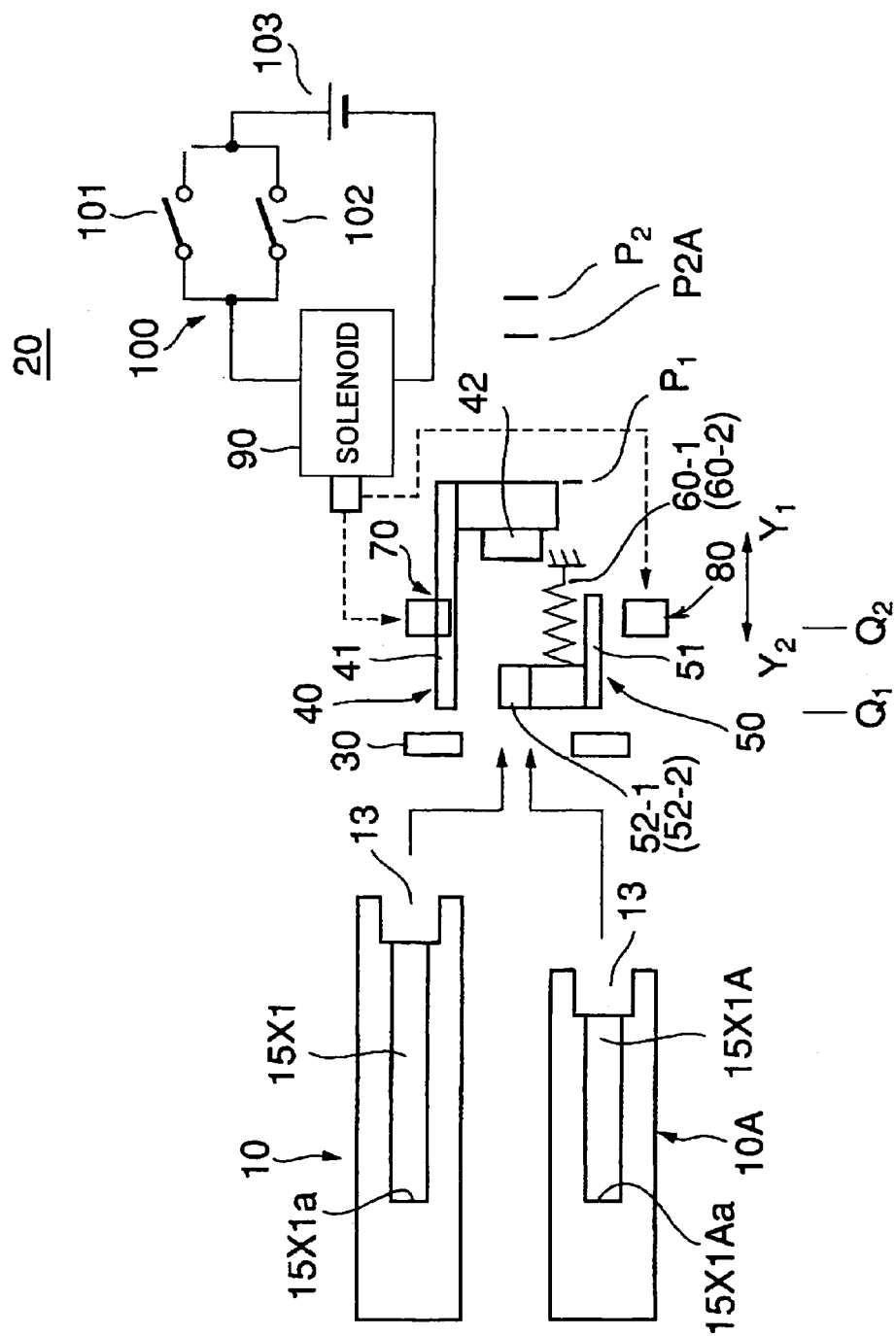
FIG. 2 shows an exemplary structure of a recording medium apparatus according to a first embodiment of the present invention.

FIG. 2 shows an exemplary structure of a recording medium apparatus 20 according to the first embodiment. Hereinafter, the insertion direction of the recording medium 10/10A is represented as the notation $Y_1$, and in contrast, the ejection direction of the recording medium 10/10A is represented as the notation $Y_2$. Also, the width, length and height directions of the recording medium 10/10A are represented as notations $X_1X_2$, $Y_1Y_2$ and $Z_1Z_2$, respectively.

Referring to FIG. 2, the recording medium apparatus 20 includes a front bezel 30, an upper slider connector unit 40, a lower slider unit 50, compression spring members 60-1 and 60-2, an upper slider connector unit lock mechanism 70, a lower slider unit lock mechanism 80, a plunger solenoid 90 and a plunger solenoid drive circuit 100.

The upper slider connector unit 40 includes an upper slider plate 41 and a connector member 42 to which the connector part 13 of the recording medium 10 or 10A is connected. While no recording medium is loaded in the recording medium apparatus 20, the upper slider connector unit 40 is positioned at a position $P_1$. In response to loading/unloading of a recording medium, the upper slider connector unit 40 is shifted between the positions $P_1$ and $P_2$.

The lower slider unit 50 includes a lower slider plate 51 and guide rail pieces 52-1 and 52-2 pushed in the $Y_1$ direction via the end part 15X1a or 15X1Aa of the guide groove 15X1 or 15X1A, respectively. While no recording medium is loaded in the recording medium apparatus 20, the lower slider unit 50 is positioned at a position $Q_1$. In response to loading/unloading of a recording medium, the lower slider unit 50 is shifted between the positions $Q_1$ and $Q_2$.

The compression spring member 60 applies $Y_2$ a directional force to the lower slider unit 50.

The upper slider connector unit lock mechanism 70 locks the upper slider connector unit 40 at the position $P_1$. In response to activation of the plunger solenoid 90, the upper slider connector unit lock mechanism 70 unlocks the upper slider connector unit 40.

The lower slider unit lock mechanism 80 locks the lower slider unit 50 shifted to the position $Q_2$. In response to activation of the plunger solenoid 90, the lower slider unit lock mechanism 80 unlocks the lower slider unit 50.

The plunger solenoid drive circuit 100 includes an insert switch 101 and an eject switch 102 arranged in parallel as illustrated in FIG. 2. The plunger solenoid drive circuit 100 is connected to a power supply 103. Here, the insert switch 101 and the eject switch 102 are configured as tactile switches. When the insert switch 101 is turned ON or the eject switch 102 is turned ON, the plunger solenoid 90 is activated.

Figure 3A:
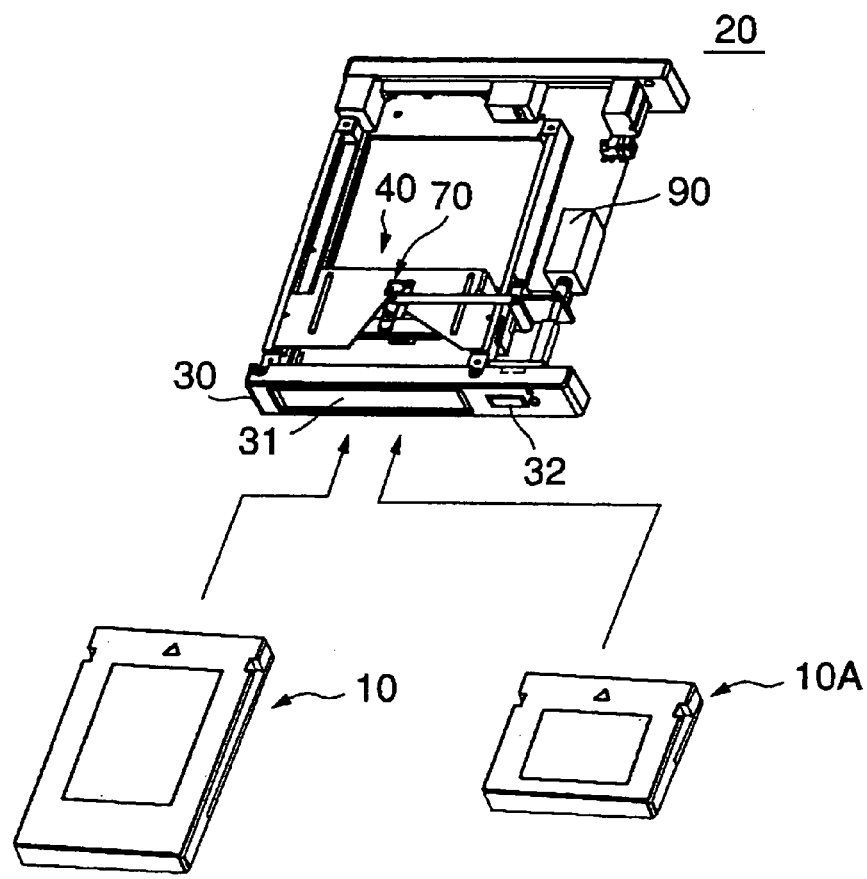
FIGS. 3A through 3C are diagrams to explain an exemplary load operation to load the recording media shown in FIG. 1 in a recording medium apparatus according to the first embodiment.
Figure 3B:
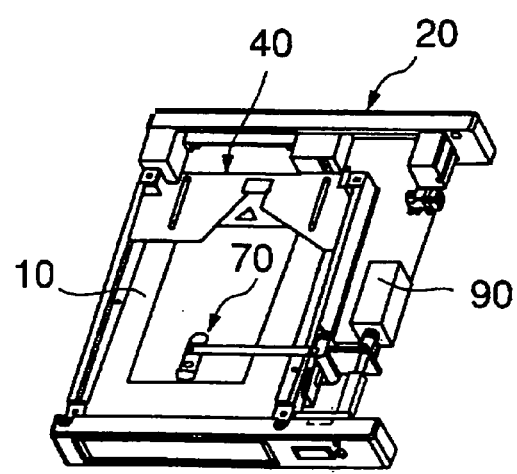
Figure 3C:
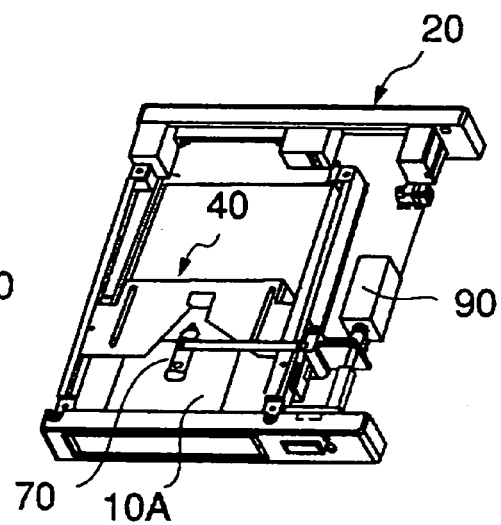

FIGS. 3A through 3C are diagrams to explain exemplary load operations to load the recording media 10 and 10A in the recording medium apparatus 20 according to the first embodiment. FIGS. 4A through 4G are diagrams to explain exemplary load and unload operations to load and unload the recording medium 10.

In order to load the recording medium 10 in the recording medium apparatus 20, a user inserts the recording medium 10 in a loading slot 31 as illustrated in FIG. 3A, and then pushes the base part 12 with a user's finger 110 toward a predefined position $P_2$ within the loading slot 31 as illustrated in FIGS. 4A and 4B.

Specifically, since the upper slider connector unit lock mechanism 70 locks the upper slider connector unit 40 at the position $P_1$ during no recording medium being loaded, the user can properly connect the connector part 13 to the connector member 42 under a stationary status of the upper slider connector unit 40. When the connector part 13 is connected to the connector member 42, the insert switch 101 is temporarily turned ON and thereby the plunger solenoid 90 is temporarily activated. In response to the activation of the plunger solenoid 90, the upper slider connector unit 40 is unlocked, as illustrated in the dashed rectangle in FIG. 4A. When the recording medium 10 is further inserted in the $Y_1$ direction, the guide rail piece 52-1 is pushed via the end part 15X1a and the lower slider unit 50 compresses the compression spring member 60-1 in the $Y_1$ direction. When the lower slider unit 50 is shifted to the position $Q_2$, the lower slider unit lock mechanism 80 locks the lower slider unit 50. As a result, the recording medium 10 is properly loaded under a status where the base part 12 is completely accommodated in the loading slot 31 as illustrated in FIGS. 3B and 4C.

In order to unload the recording medium 10 after completion of some information record/reproduce operation on the recording medium 10, the user pushes an eject button 32 and pulls the recording medium 10 in the $Y_2$ direction by pinching the protruded base part 12 of the recording medium 10 with user's fingers 110.

Specifically, in response to user's pushing of the eject button 32, the eject switch 102 is temporarily turned ON, and thereby the plunger solenoid 90 is temporarily activated. In response to the activation of the plunger solenoid 90, the lower slider unit 50 is unlocked. Then, the lower slider unit 50 is shifted toward the original position $Q_1$ thereof in the $Y_2$ direction by the compression spring member 60-1. As a result, the base part 12 of the recording medium 10 is protruded from the loading slot 31 as illustrated in FIG. 4E. Then, the user pulls the recording medium 10 in the $Y_2$ direction by pinching the protruded base part 12 of the recording medium 10 with user's fingers 110. As shown in FIG. 4F, the upper slider connector unit 40 is also being shifted to the original position $P_1$ thereof. Then, as shown in FIG. 4G, the user can fetch out the recording medium 10 by detaching the connector part 13 from the connector member 42.

On the other hand, in order to load/unload the recording medium 10A, a user performs the same manipulation, and the recording medium apparatus 20 also operates almost similarly, as described below.

FIGS. 5A through 5G are diagrams to explain exemplary load and unload operations to load and unload the recording medium 10A.

As shown in FIG. 5A, a user inserts the recording medium 10A in the loading slot 31 and pushes the base part 12A with a user's finger 110 toward a predefined position $P_2A$ within the loading slot 31 as illustrated in FIGS. 5A and 5B.

Specifically, since the upper slider connector unit lock mechanism 70 locks the upper slider connector unit 40 at the position $P_1$ during no recording medium being loaded, the user can properly connect the connector part 13 to the connector member 42 under a stationary status of the upper slider connector unit 40. When the connector part 13 is connected to the connector member 42, the insert switch 101 is temporarily turned ON, and thereby the plunger solenoid 90 is temporarily activated. In response to the activation of the solenoid plunger 90, the upper slider connector unit 40 is unlocked, as illustrated in the dashed rectangular in FIG. 5A. When the recording medium 10A is further inserted in the $Y_1$ direction, the guide rail piece 52-1 is pushed via the end part 15X1Aa and the lower slider unit 50 compresses the compression spring member 60-1 in the $Y_1$ direction. When the lower slider unit 50 is shifted to the position $Q_2$, the lower slider unit lock mechanism 80 locks the lower slider unit 50. As a result, the recording medium 10A is properly loaded under a status where the base part 12A is completely accommodated in the loading slot 31 as illustrated in FIGS. 3B and 5C.

In order to unload the recording medium 10A after completion of some information record/reproduce operation on the recording medium 10A, the user pushes the eject button 32 and pulls the recording medium 10A in the $Y_2$ direction by pinching the protruded base part 12A of the recording medium 10A with user's fingers 110.

Specifically, in response to user's pushing of the eject button 32, the eject switch 102 is temporarily turned ON, and thereby the plunger solenoid 90 is temporarily activated. In response to the activation of the plunger solenoid 90, the lower slider unit 50 is unlocked. Then, the lower slider unit 50 is shifted toward the original position $Q_1$ thereof in the $Y_2$ direction by the compression spring member 60-1. As a result, the base part 12A of the recording medium 10A is protruded from the loading slot 31 as illustrated in FIG. 5E. Then, the user pulls the recording medium 10A in the $Y_2$ direction by pinching the protruded base part 12A of the recording medium 10A with user's fingers 110. As shown in FIG. 5F, the upper slider connector unit 40 is being shifted to the original position $P_1$ thereof. Then, as shown in FIG. 5G, the user can fetch out the recording medium 10A by detaching the connector part 13 from the connector member 42.

A detailed description is given, with reference to FIG. 6 through FIG. 9, of the recording medium apparatus 20 according to the first embodiment.

Figure 6:
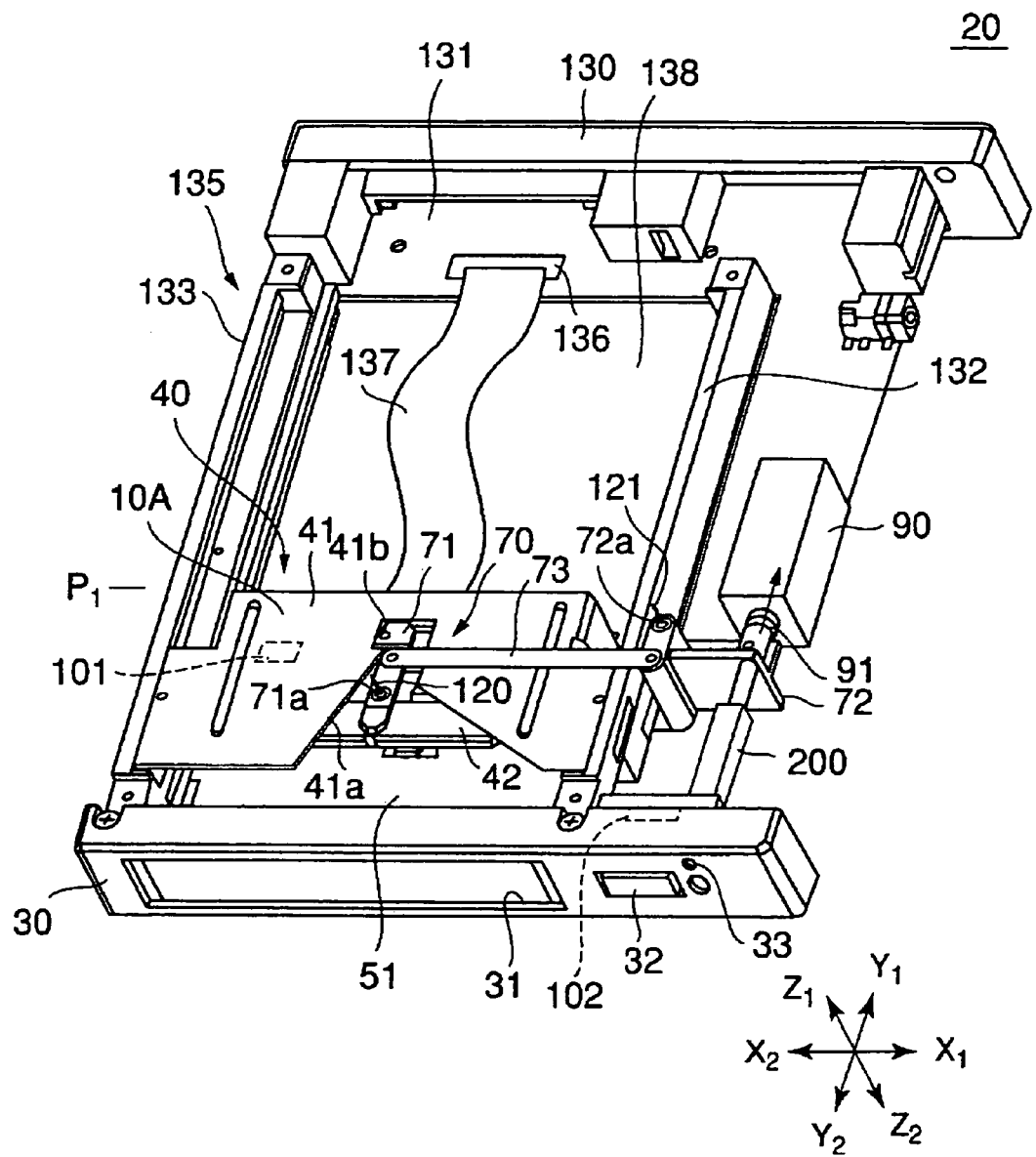
FIG. 6 is a top perspective view of a recording medium apparatus according to the first embodiment.

FIG. 6 is a top perspective view of the recording medium apparatus 20 according to the first embodiment. In FIG. 6, the recording medium apparatus 20 without loading of a recording medium is illustrated. In order to show the inner structure of the recording medium apparatus 20 more conveniently, the upper and lower covers of the recording medium apparatus 20 are omitted. In this embodiment, such upper and lower covers are actually fixed to a frame structure 135 of the recording medium apparatus 20 described below.

Referring to FIG. 6, the recording medium apparatus 20 includes a front bezel 30, a rear-side frame 130, a rear-side print substrate 131, an X1-side guide rail 132, an X2-side guide rail 133 and a rectangular frame structure 135. In addition, the upper slider connector unit 40, the lower slider unit 50, the compression spring members 60-1 and 60-2, the upper slider connector unit lock mechanism 70, the lower slider unit lock mechanism 80 and the plunger solenoid 90 are mounted to the frame structure 135.

As shown in FIG. 6, the upper slider connector unit 40 includes an upper slider plate 41 disposed between the guide rails 132 and 133, a connector member 42 fixed on the back surface of the upper slider plate 41, hook members 43 and 44 (not illustrated) that are fixed to both sides of the back surface of the upper slider plate 41 and are supported on the guide rails 132 and 133, and an insert switch 101 fixed on the back surface of the upper slider plate 41. The connector member 42 is positioned in an area 138 ranging the guide rails 132 and 133. A notch 41a, which is widened in the $Y_2$ direction, is formed in the upper slider plate 41. The notch 41a includes an L-shaped part 41b at the $Y_1$ side of the upper slider plate 41. The connector member 42 is connected to a connector 136 on the print substrate 131 via a flexible cable 137.

Figure 7:
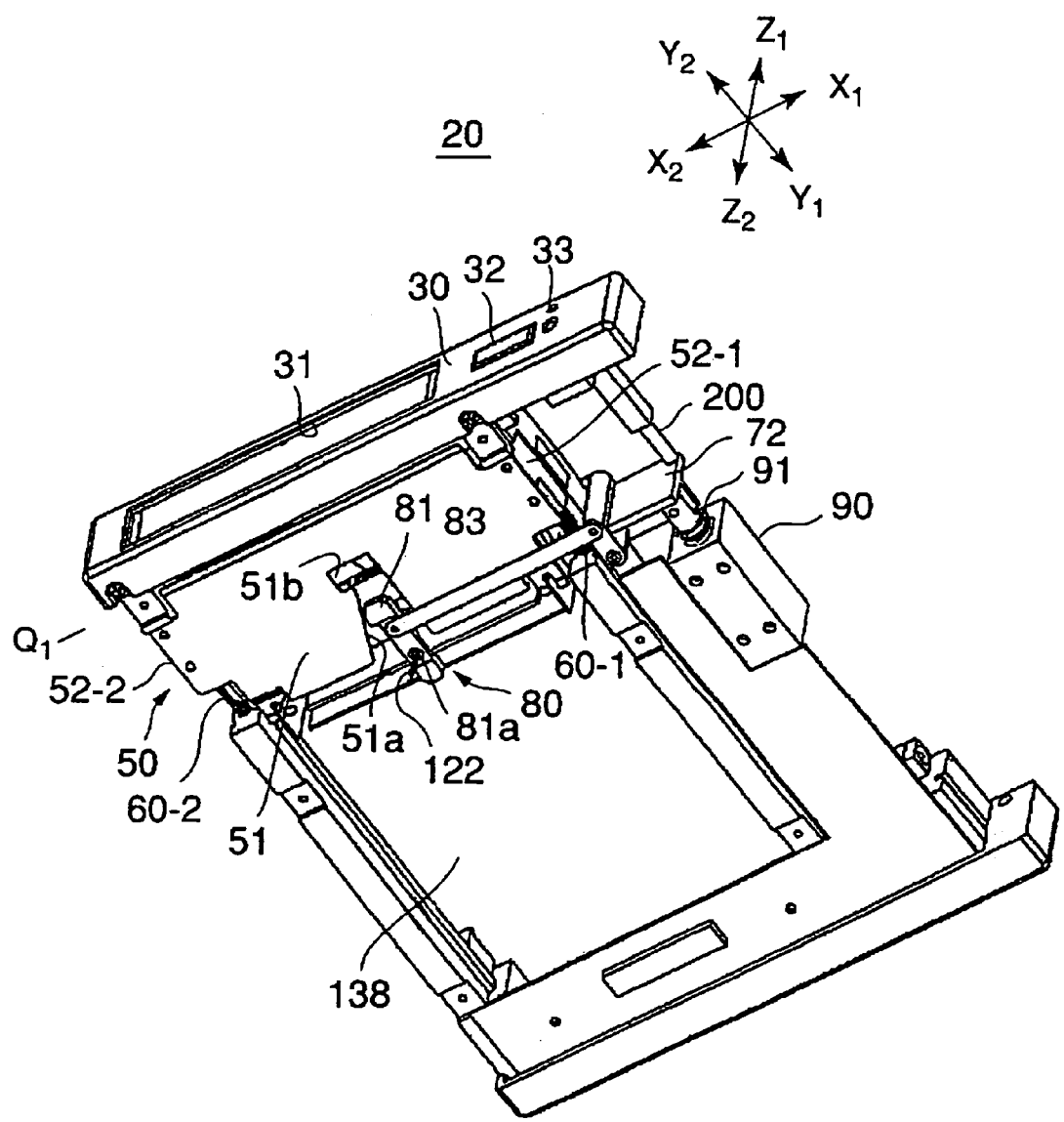
FIG. 7 is a bottom perspective view of the recording medium apparatus in FIG. 6.
Figure 9:
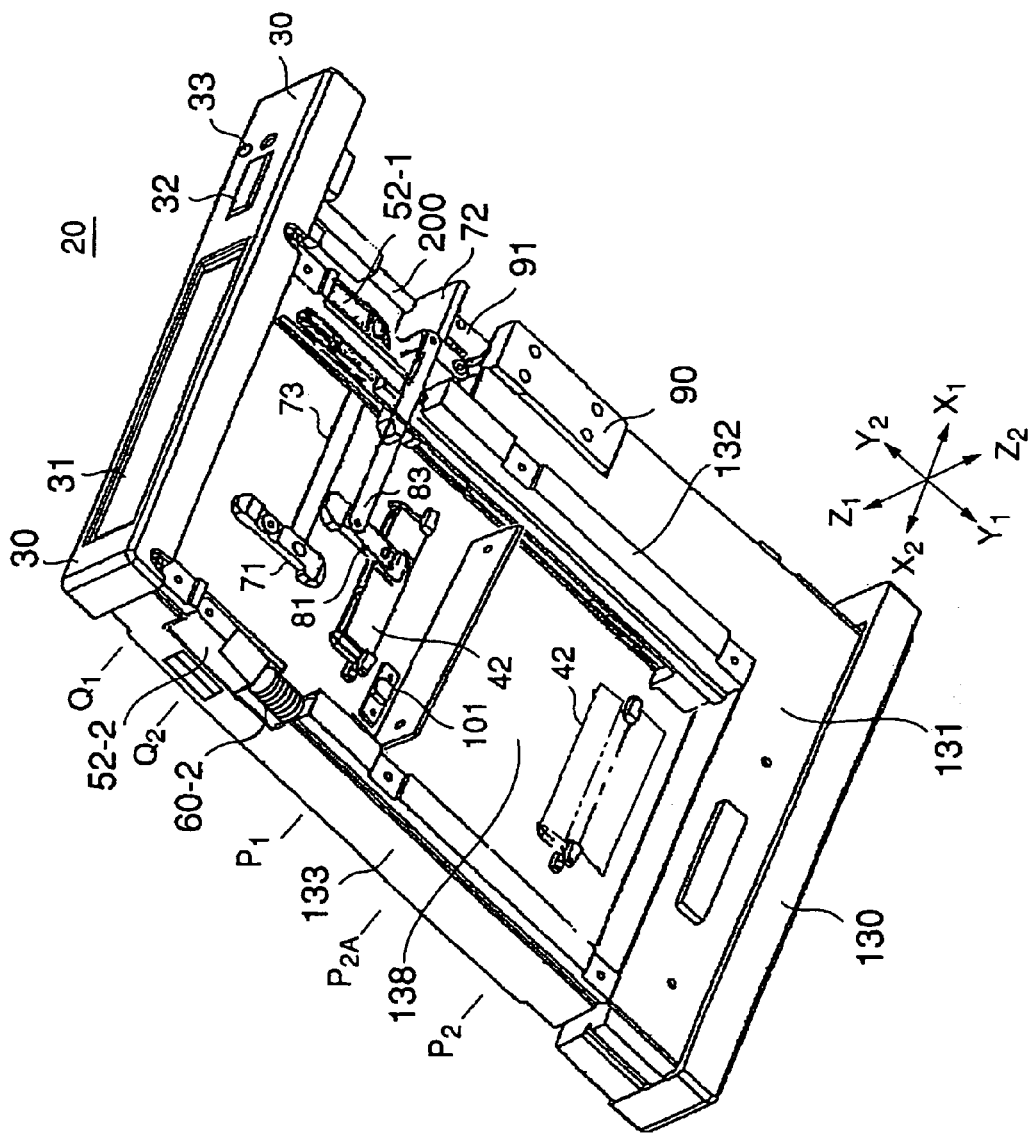
FIG. 9 is a bottom perspective view of the recording medium apparatus in FIG. 6 under a status where upper and lower sliders are omitted.

FIG. 7 is a bottom perspective view of the recording medium apparatus 20 in FIG. 6. FIGS. 8A and 8B shows exemplary guide rail pieces of the recording medium apparatus 20 according to the first embodiment. FIG. 9 is a bottom perspective view of the recording medium apparatus 20 under a status where upper and lower sliders are omitted. Like FIG. 6, in order to show the inner structure of the recording medium apparatus 20 more conveniently, the recording medium apparatus 20 is illustrated in FIG. 9 under a status where the upper and lower covers are omitted.

Referring to FIG. 7, the lower slider unit 50 includes a lower slider plate 51 provided between the guide rails 132 and 133, and guide rail pieces 52-1 and 52-2. As shown in FIG. 8A, the guide rail piece 52-1 is engaged with the guide rail 132 at a $Y_2$-side position of the guide rail 132 such that the guide rail piece 52-1 can be slid. A protrusion part 52-1a is protruded toward the interior of the guide rail 132 and is aligned together with a rail part 132a of the guide rail 132. As shown in FIG. 7, both ends of the lower slider plate 51 are fixed to the guide rail pieces 52-1 and 52-2. In FIG. 8B, the guide rail piece 52-1 is being shifted in the $Y_1$ direction. As shown in FIG. 7, a notch 51a, which is widen in the $Y_1$ direction, is formed in the lower slider plate 51. The notch 51a includes an L-shaped part 51b at the $Y_2$ side of the lower slider plate 51. The compression spring member 60-1, which is mounted to the guide rail 132, applies a $Y_2$ directional force to the guide rail piece 52-1. As shown in FIG. 7, the guide rail piece 52-2 has the same shape as the guide rail piece 52-1. The guide rail piece 52-2 is also supported such that the guide rail piece 52-2 can be slid. The compression spring member 60-2 also applies a $Y_2$ directional force to the guide rail piece 52-2.

As shown in FIG. 6 and FIG. 9, the upper slider connector unit lock mechanism 70 includes a lock member 71, a link member 72 having an almost L-shape from the viewpoint of the $Z_1$ direction, a link bar 73 coupling between the lock member 71 and the link member 72, and a plunger solenoid 90. The lock member 71 is engaged with a fixing pin 120 provided on the back surface of the upper cover (not illustrated) via a shaft hole 71a. The link member 72 is engaged with a fixing pin 121 provided between the upper and lower covers (not illustrated) via a shaft hole 72a. A recovery spring 91 is incorporated in the plunger solenoid 90, and the plunger solenoid 90, which is fixed to the lower cover (not illustrated), is coupled to the link member 72. The lock member 71 is coupled to the L-shaped part 51b shown in FIG. 7. The upper slider connector unit 40 is locked at the position $P_1$ so that the $Y_1$ directional shift thereof can be controlled. In response to activation of the plunger solenoid 90, the lock member 71 is revolved clockwise with respect to the location shown in FIG. 6 via the link member 72 and the link bar 73, and thereby the lock member 71 is detached from the L-shape part 51b. As a result, the upper slider connector unit 40 is unlocked.

As shown in FIG. 7 and FIG. 9, the lower slider unit lock mechanism 80 includes a lock member 81, the link member 72, a link bar 83 coupling between the lock member 81 and the link member 72, and the plunger solenoid 90. The lock member 81 is engaged with a fixing pin 122 provided on the top surface of the lower cover (not illustrated) via a shaft hole 81a. When the lower slider unit part 50 is shifted to the position $Q_2$ in the $Y_1$ direction, the L-shape part 51b is coupled to the lock member 81 (see FIG. 13 and FIG. 16) and thereby the lower slider unit part 50 is locked so that the $Y_2$ directional shift thereof can be controlled. In response to activation of the plunger solenoid 90, the lock member 81 is revolved clockwise with respect to the location in FIG. 7 via the link member 72 and the link bar 73, and thereby the lock member 81 is detached from the L-shape part 51b. As a result, the lower slider unit 50 is unlocked.

A description is given, with reference to FIG. 10 through FIG. 13, of a case where the recording medium 10 is loaded in the recording medium apparatus 20 according to the first embodiment.

Figure 10:
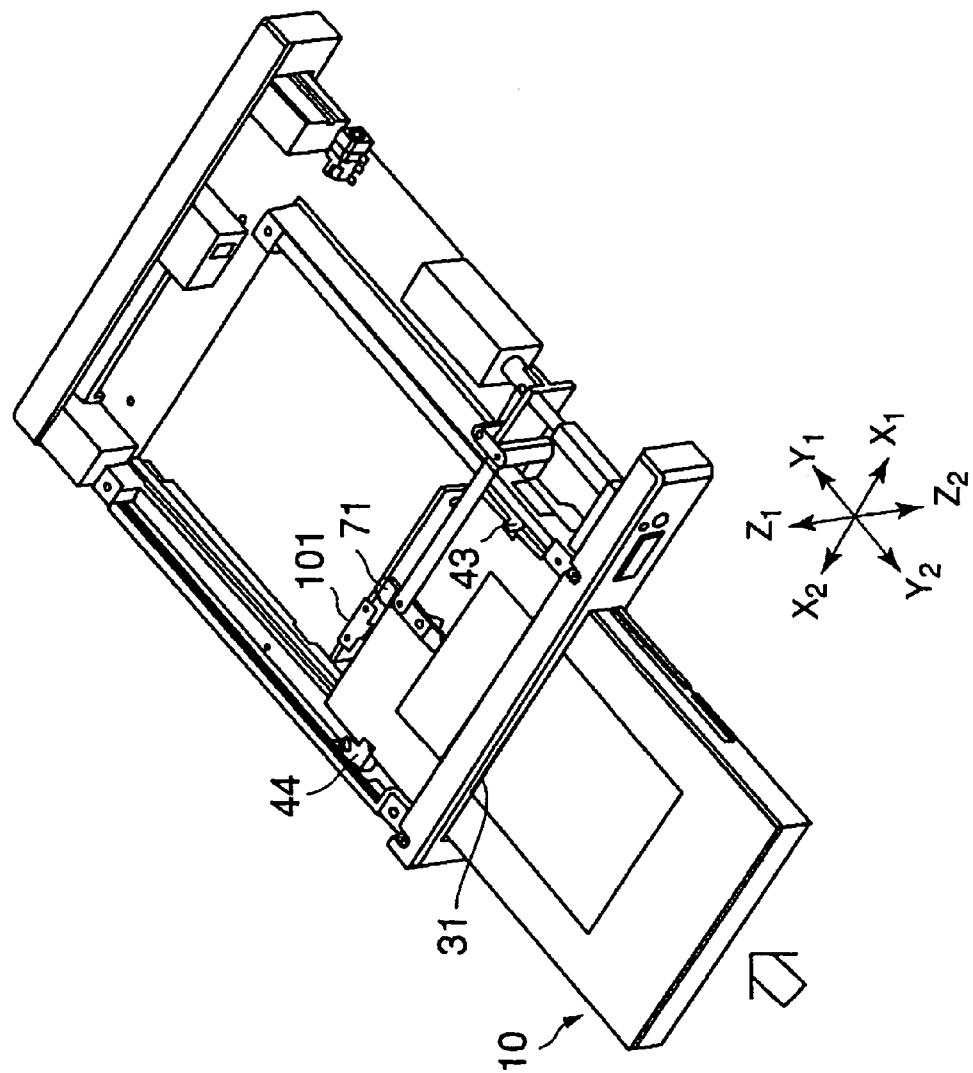
FIG. 10 is a top perspective view of a recording medium apparatus according to the first embodiment under a status where the first type of recording medium is being loaded thereto.
Figure 11:
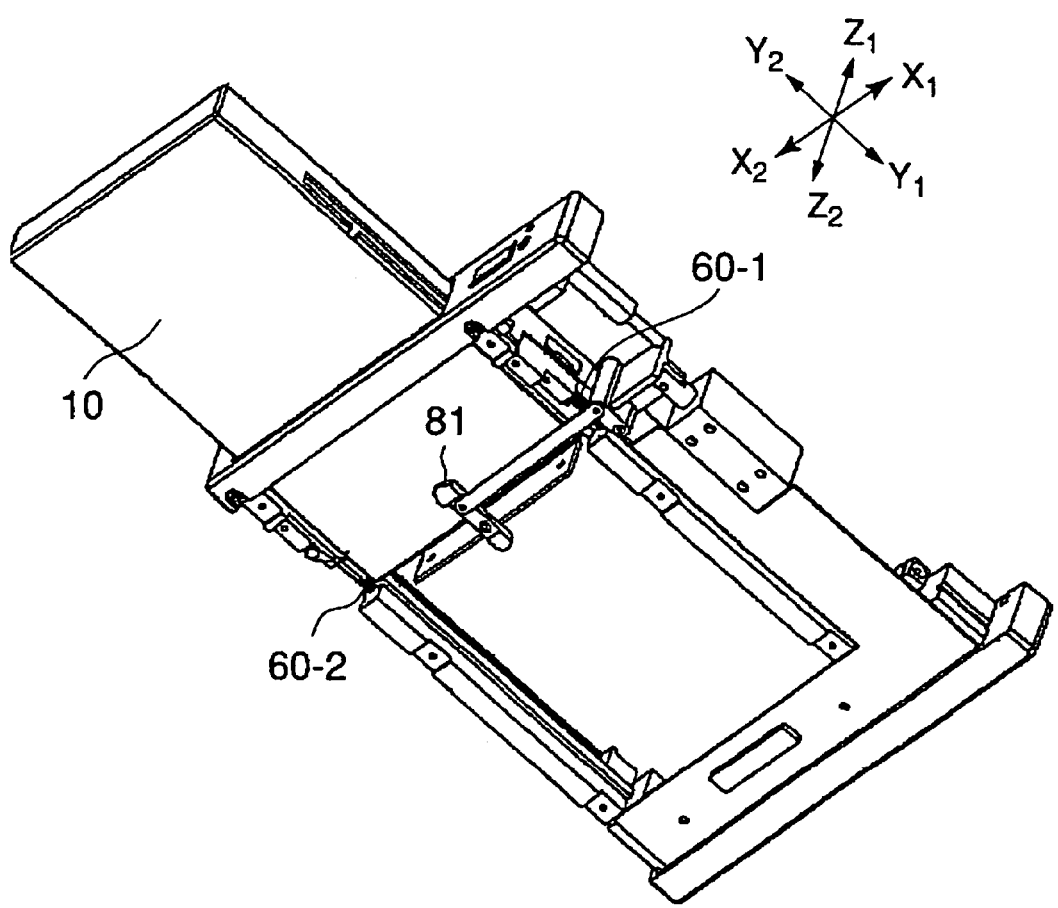
FIG. 11 is a bottom perspective view of the recording medium apparatus under the status in FIG. 10.
Figure 12:
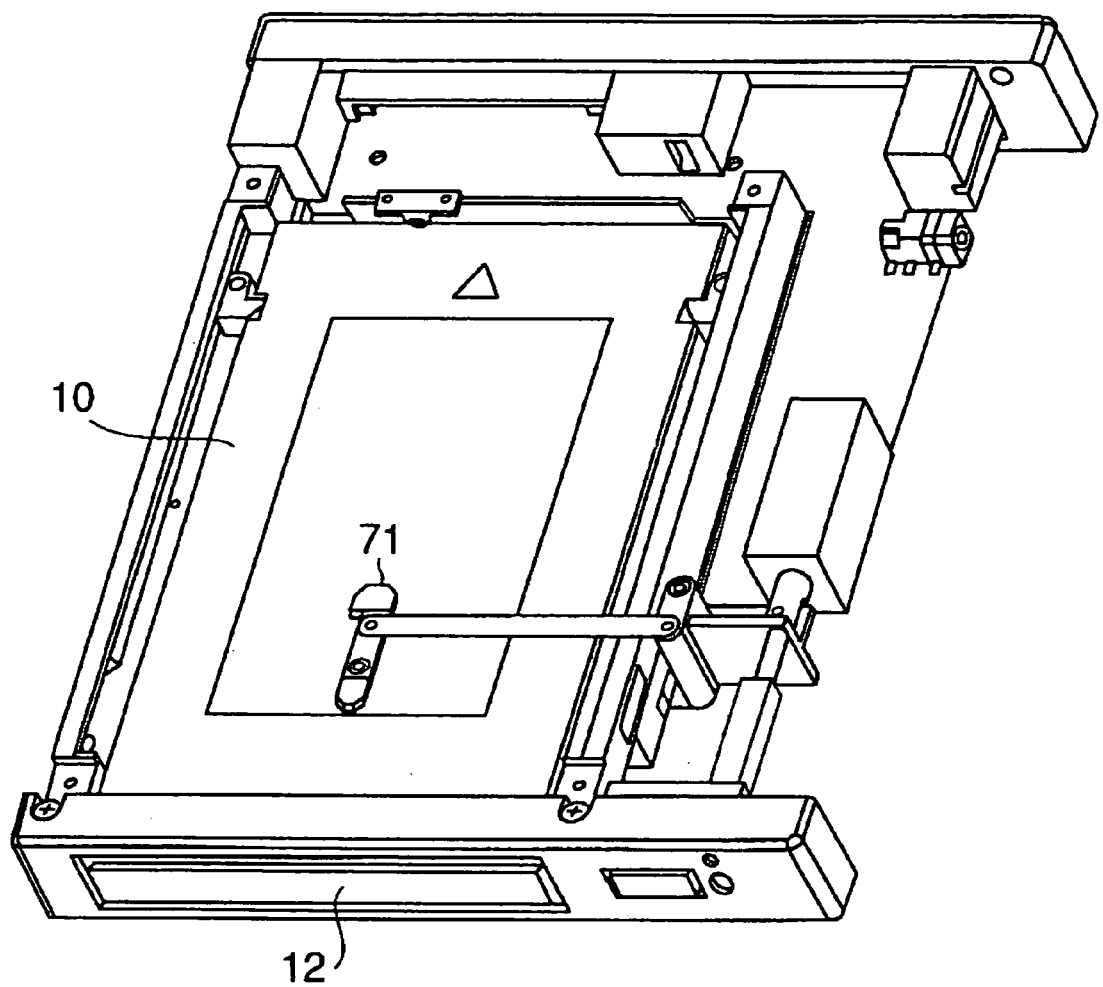
FIG. 12 is a top perspective view of the recording medium apparatus according to the first embodiment under a status where the recording medium has been loaded thereto.
Figure 13:
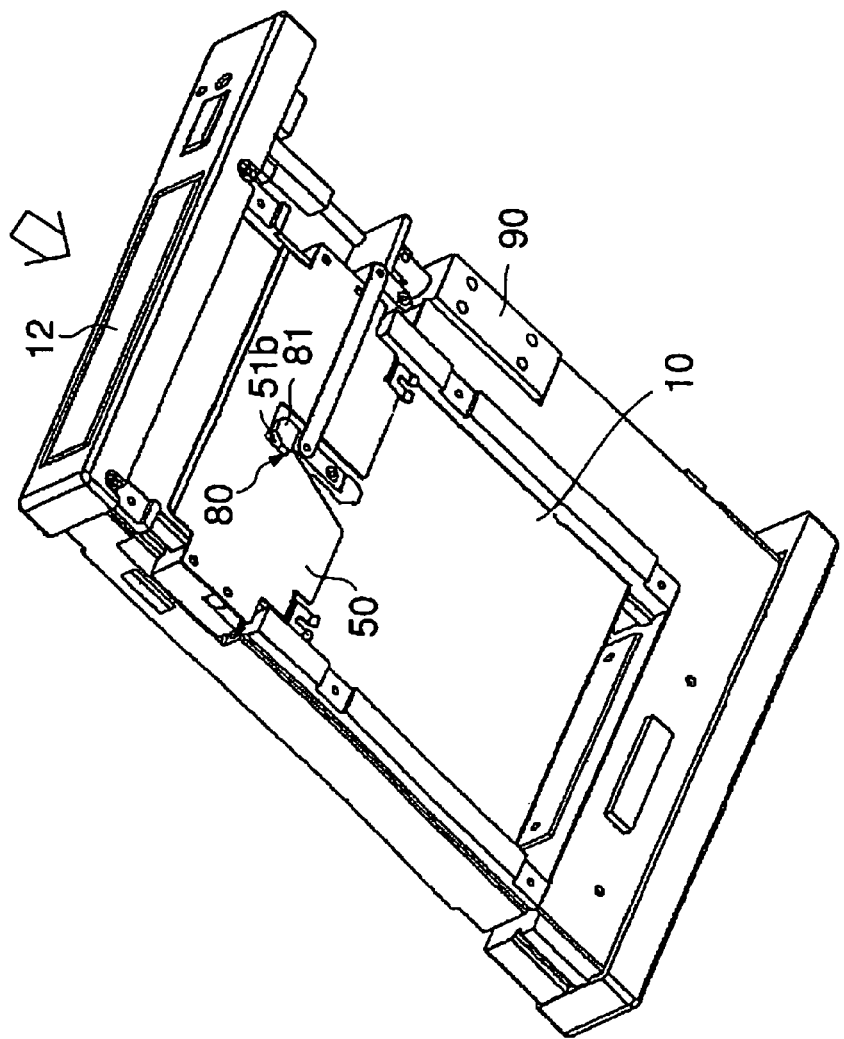
FIG. 13 is a bottom perspective view of the recording medium apparatus under the status in FIG. 12.

FIG. 10 is a top perspective view of the recording medium apparatus 20 according to the first embodiment under a status where the recording medium 10 is being loaded thereto. FIG. 11 is a bottom perspective view of the recording medium apparatus 20 under the status in FIG. 10. FIG. 12 is a top perspective view of the recording medium apparatus 20 under a status where the recording medium 10 has been loaded thereto. FIG. 13 is a bottom perspective view of the recording medium apparatus 20 under the status in FIG. 12.

When a user inserts the recording medium 10 in the loading slot 31, the guide groove 15X1 shown in FIG. 1A is engaged with the protrusion part 52-1a and the rail part 132a shown in FIG. 8, and at the same time the guide groove 15X2 shown in FIG. 1A is also engaged with the protrusion part 52-2a and the rail part 133a (not illustrated). At this time, the recording medium 10 is inserted through guidance of X1 and X2 sides. By further user's insertion of the recording medium 10, the connector part 13 of the recording medium 10 is coupled to the connector member 42, as mentioned above. Then, the recording medium 10 pushes the insert switch 101, and thereby the insert switch 101 is temporarily turned ON and the plunger solenoid 90 is temporarily activated. In response to the activation of the plunger solenoid 90, the lock member 71 is revolved and detached from the L-shape part 41b, and thereby the upper slider connector unit 40 is unlocked. When the recording medium 10 is further inserted and pushed together with the upper slider connector unit 40, the hook members 43 and 44 shown in FIG. 10 are engaged with the concave parts 17X1 and 17X2 shown in FIG. 1A, respectively, and the recording medium 10 is coupled to the upper slider connector unit 40.

At the final step of user's pushing the recording medium 10, the end parts 15X1a and 15X2a push the guide rail pieces 52-1 and 52-2, respectively. The lower slider unit 50 compresses the compression spring members 60-1 and 60-2 and is shifted in the $Y_1$ direction. When the lower slider unit part 50 is shifted to the position $Q_2$, the L-shape part 51b is engaged with the lock member 81 and thereby the lower slider unit 50 is locked. As a result, the recording medium 10 and the recording medium apparatus 20 come into the status shown in FIG. 12 and FIG. 13. Namely, the recording medium 10 is loaded under a status where the base part 12 of the recording medium 10 is completely accommodated in the loading slot 31.

In order to unload the recording medium 10, when a user pushes the eject button 32 after completion of some information record/reproduce operation on the recording medium 10, the eject switch 102 is temporarily turned ON, and thereby the plunger solenoid 90 is temporarily activated. In response to the activation of the plunger solenoid 90, the lock member 81 is revolved and detached from the L-shape part 51b, and thereby the lower slider unit 50 is unlocked and the compression spring members 60-1 and 60-2 shift the lower slide unit 50 back to the original position $Q_1$ thereof in the $Y_2$ direction. Also, the guide rail pieces 52-1 and 52-2 push the end parts 15X1a and 15X2a, and thereby the recording medium 10 is shifted in the $Y_2$ direction. In addition, the upper slider connector unit 40, which is coupled to the recording medium 10 via the hook members 43 and 44, is also shifted in the $Y_2$ direction. As a result, the recording medium 10 and the recording medium apparatus 20 come into the status illustrated in FIG. 10 and FIG. 11. Namely, the base part 12 of the recording medium 10 is protruded from the loading slot 31. In addition, the L-shape part 41b is engaged with the lock member 71, and the upper slider connector unit 40 is locked by the upper slider connector unit lock mechanism 70.

Then, the user pulls the recording medium 10 in the $Y_2$ direction by pinching the protruded base part 12 with user's fingers 110. Since the recording medium 10 is coupled to the upper slider connector unit 40 through connection between the hook members 43 and 44 and the respective concave parts 17X1 and 17X2, the upper slider connector unit 40 is shifted to the original position $P_1$ thereof in a status where the connector part 13 is connected to the connector member 42, as illustrated in FIG. 4F. When the upper slider connector unit 40 is shifted back to the original position $P_1$ thereof, the shift of the upper slider connector unit 40 is stopped, and the hook members 43 and 44 is unhooked from the respective concave parts 17X1 and 17X2. As a result, as shown in FIG. 4G, the recording medium 10 can be fetched out by separating the connector 13 from the connector member 42.

Figure 14:
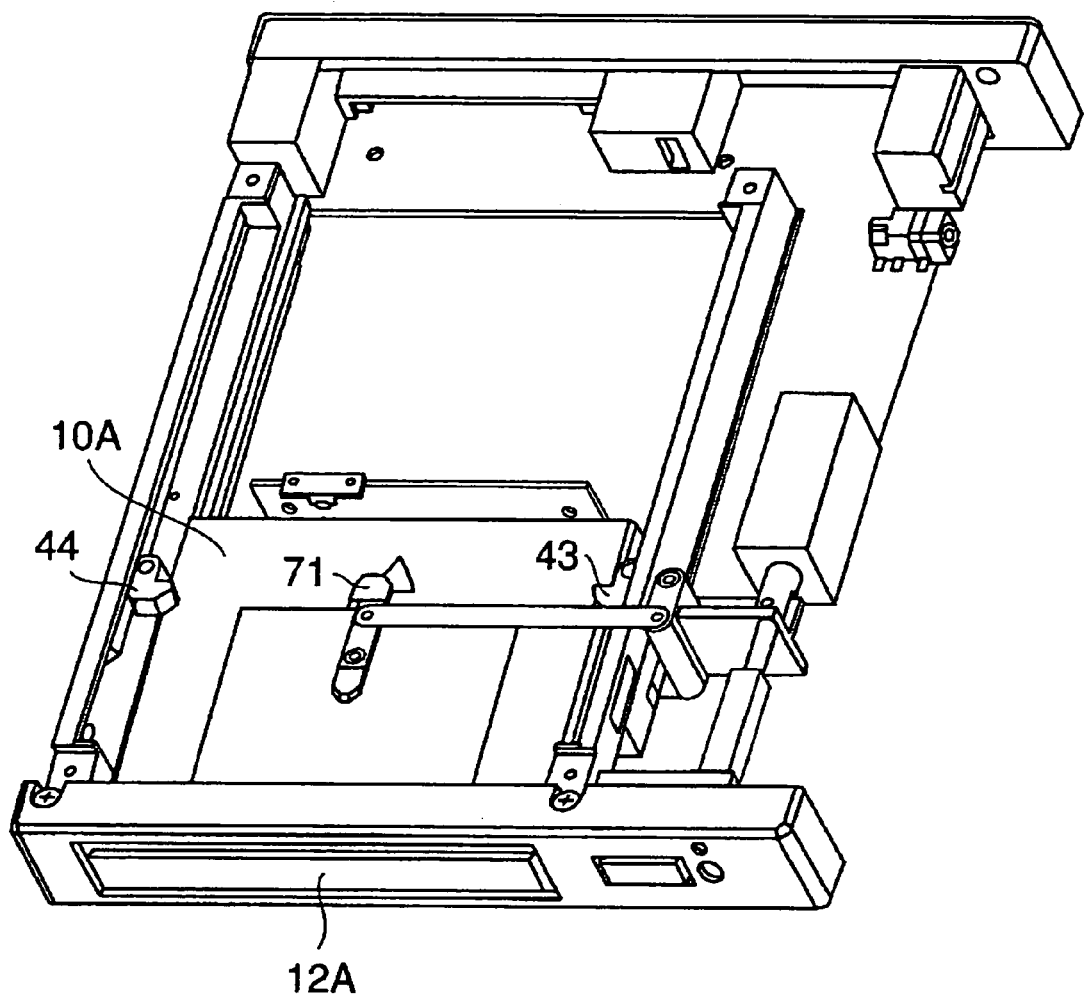
FIG. 14 is a top perspective view of a recording medium apparatus according to the first embodiment under a status where the second type of recording medium is being loaded thereto.
Figure 15:
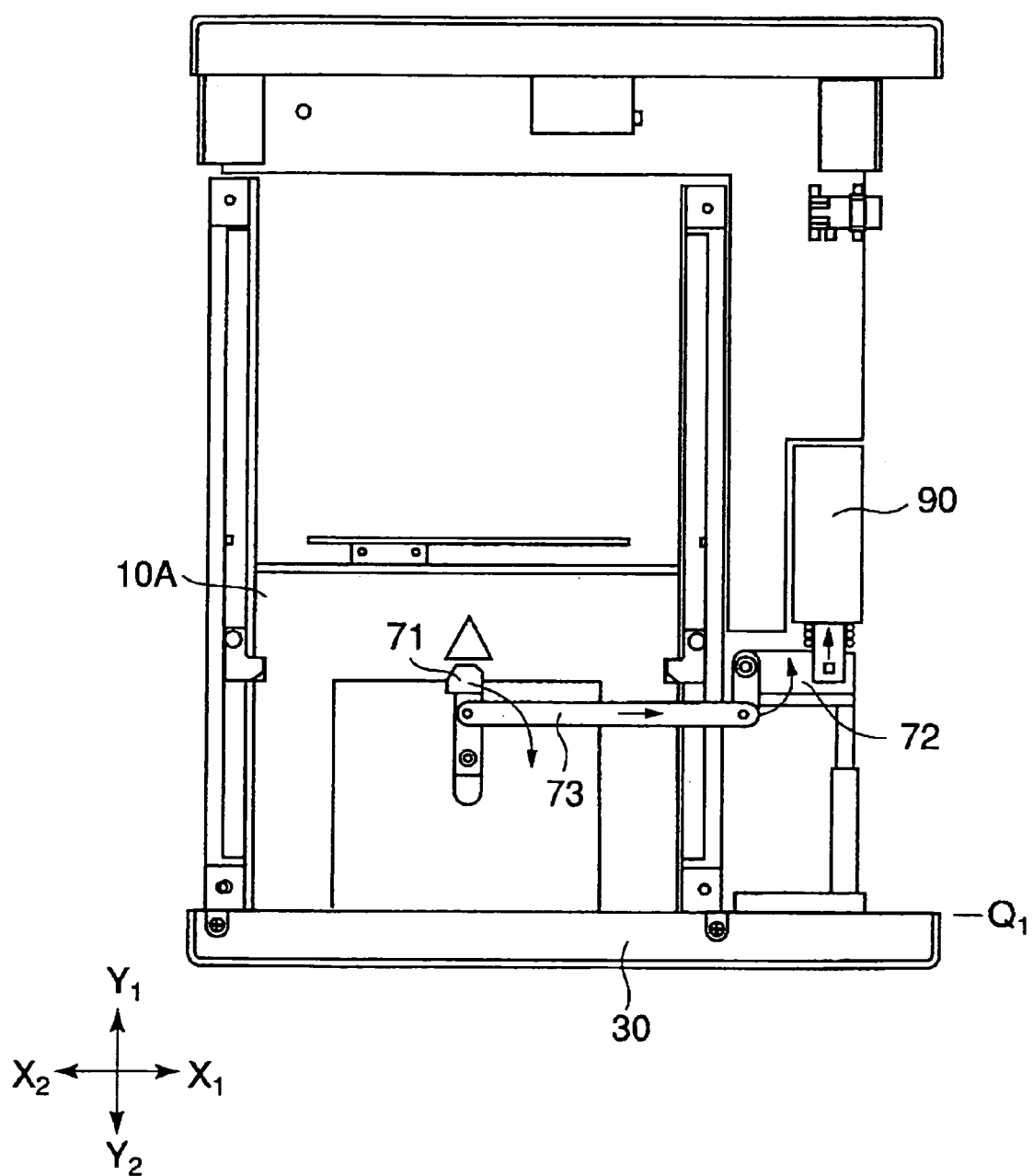
FIG. 15 is a plan view of the recording medium apparatus under the status in FIG. 14.
Figure 16:
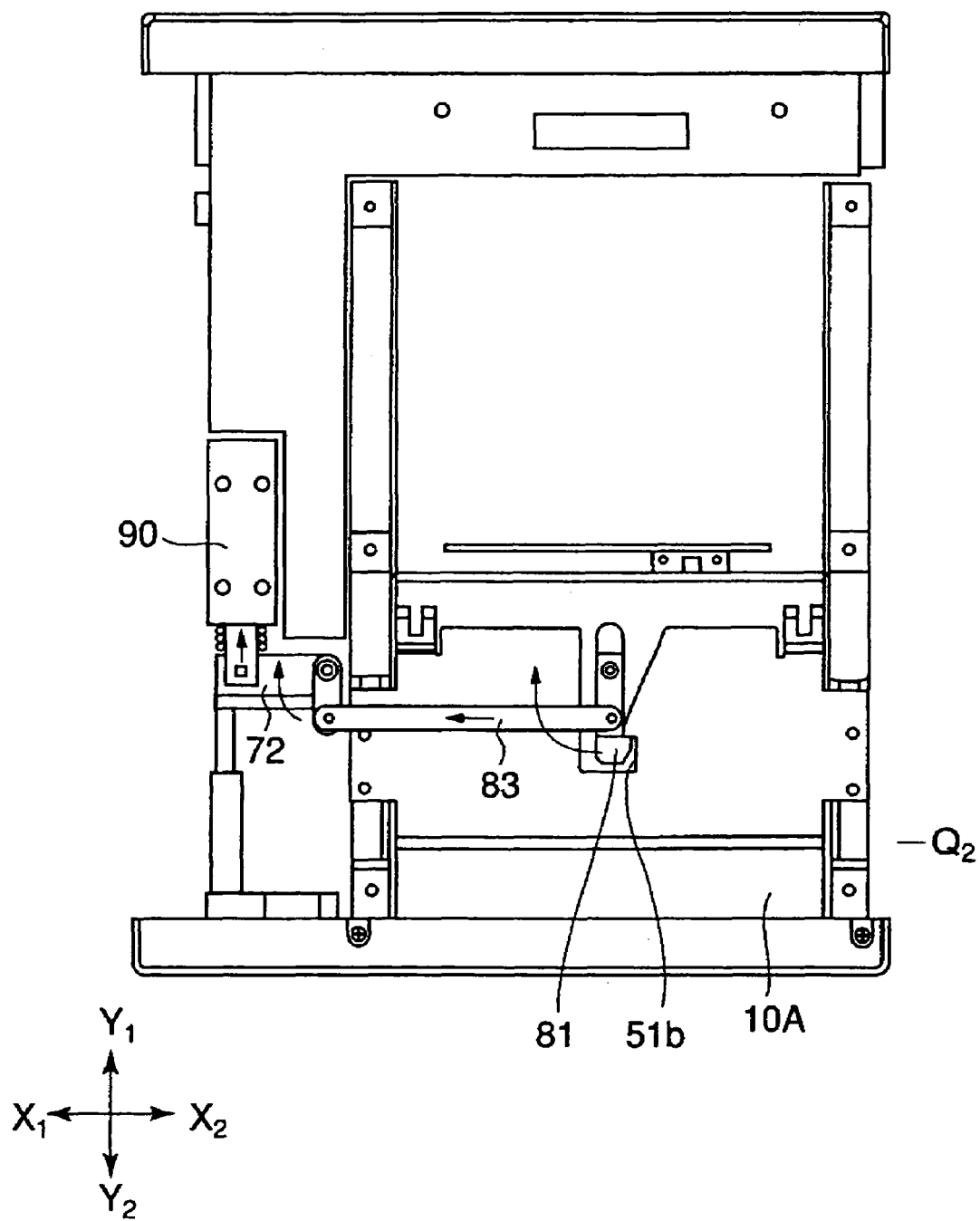
FIG. 16 is a bottom view of the recording medium apparatus under the status in FIG. 14.

A description is given, with reference to FIG. 14 through FIG. 16, of a case where the recording medium 10A is loaded in the recording medium apparatus 20 according to the first embodiment.

FIG. 14 is a top perspective view of the recording medium apparatus according to the first embodiment under a status where the recording medium 10A is being loaded thereto. FIG. 15 is a plan view of the recording medium apparatus 20 under the status in FIG. 14. FIG. 16 is a bottom view of the recording medium apparatus 20 under the status in FIG. 14.

Referring to FIG. 14 through FIG. 16, when a user inserts the base part 12A of the recording medium 10A in the loading slot 31, the connector part 13 is connected to the connector member 42 as in the loading of the recording medium 10. Then, the upper slider connector unit 40 is unlocked, and the lower slider unit 50 is locked. The recording medium 10A is loaded to the recording medium apparatus 20 as illustrated in FIG. 14 through FIG. 16.

When the user pushes the eject button 32 after completion of some information record/reproduce operation, the lower slider unit 50 is unlocked and shifted back to the original position $Q_1$ thereof, and thereby the base part 12A of the recording medium 10A is protruded from the loading slot 31 as in the unloading of the recording medium 10. Then, the user pulls the recording medium 10A in the $Y_2$ direction by pinching the protruded base part 12A with user's fingers 110. Thereby, the connector part 13 is separated from the connector member 42, and the recording medium 10A can be unloaded.

Accidentally, when the recording medium 10 or 10A is to be unloaded from the recording medium apparatus 20, there may be a case where the plunger solenoid 90 cannot be activated regardless of user's manipulation on the eject button 32, for example, due to a power cut. In such a case, a user can activate an emergency member 200 by inserting a thin rod in a hole 33 of the front bezel 30, as shown in FIG. 6. In response to the activation of the emergency member 200, the link member 72 is revolved and the lower slider unit 50 is unlocked. As a result, it is possible to fetch out the recording medium 10 or 10A without trouble even in the irregular case.

In summary, a recording medium apparatus 20 loads a plurality of types of recording media 10 and 10A, each of which has a terminal at the insertion side thereof, by user's pushing of the recording media 10 and 10A toward a predefined position within the recording medium apparatus. The recording medium apparatus 20 is configured to include the upper slider connector unit 40, the lower slider unit 50, the upper slider connector unit lock mechanism 70, the lower slider unit lock mechanism 80 and the compression spring members 60. The upper slider connector unit 40 includes a connector and is shifted through insertion of a recording medium. When the recording medium reaches a predefined position, the lower slider unit 50 is shifted by pushing of the recording medium via the opposite side to the insertion side. The upper slider connector unit lock mechanism 70 is for locking the upper slider connector unit 40. When a terminal of the recording medium is connected to the connector, the upper slider connector unit lock mechanism 70 unlocks the upper slider connector unit 40. The lower slider unit lock mechanism 80 is for locking the lower slider unit 50. In response to eject manipulation, the lower slider unit lock mechanism 80 unlocks the lower slider unit 50. The compression spring members 60 are deformed through the shift of the lower slider unit 50 and applies an ejection force to the recording medium via the lower slider unit 50.

According to the first embodiment, it is possible to provide a recording medium apparatus that can mechanically and manually load and unload a plurality of type of recording media having different lengths with respect to the insertion direction thereof.

A recording medium apparatus according to a second embodiment of the present invention is described.

Figure 17:
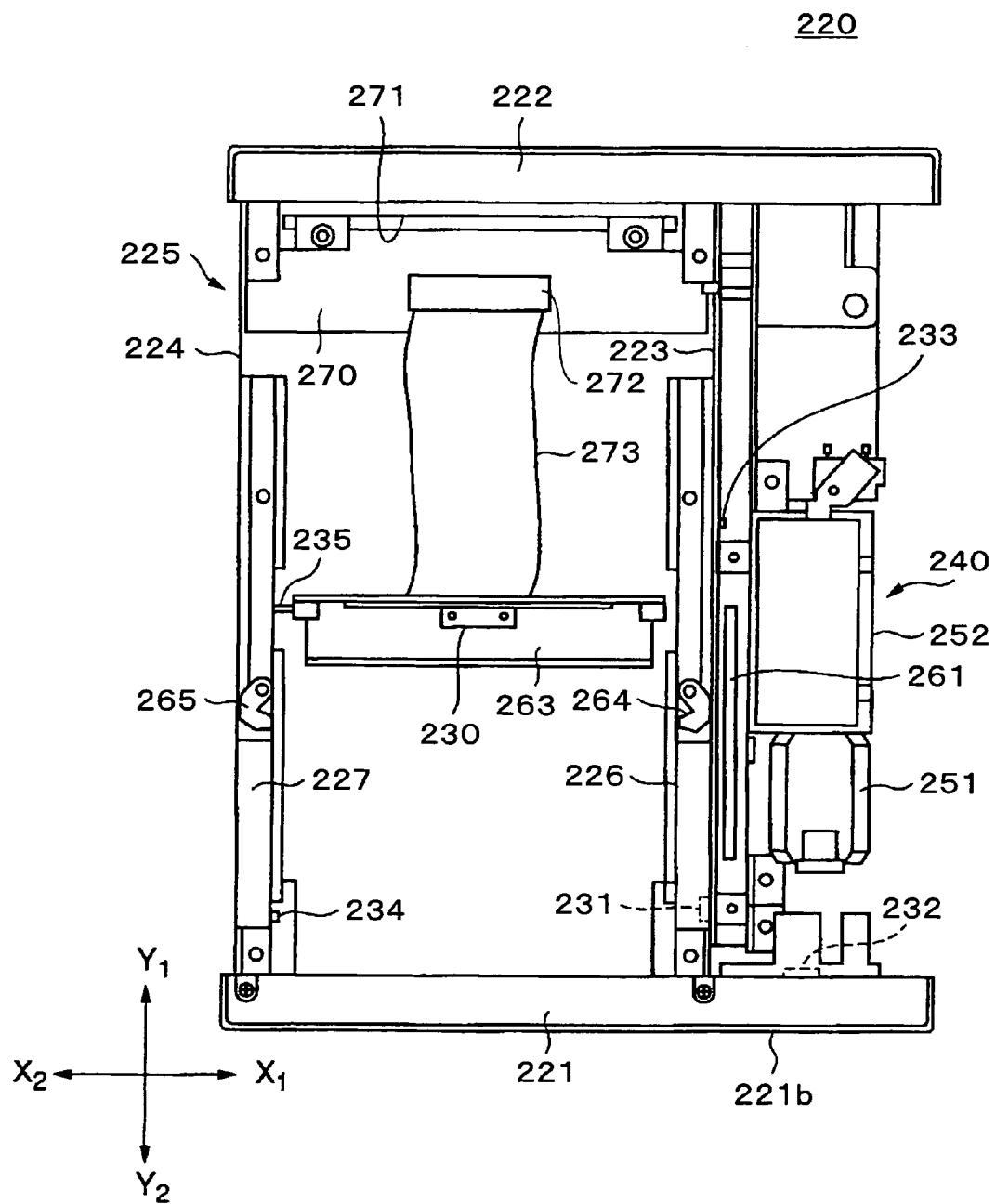
FIG. 17 is a plan view of a recording medium apparatus according to a second embodiment of the present invention.
Figure 18:
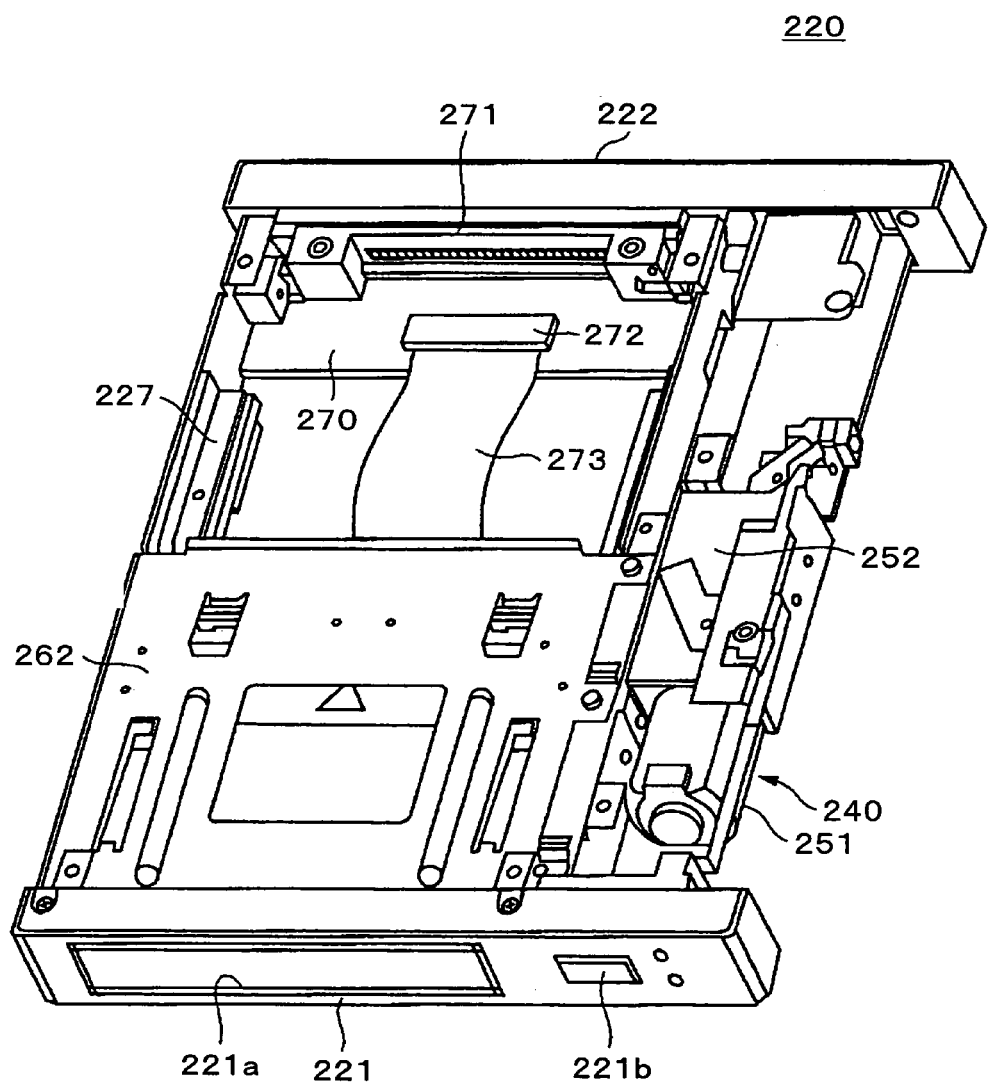
FIG. 18 is a perspective view of the recording medium according to the second embodiment.
Figure 19:
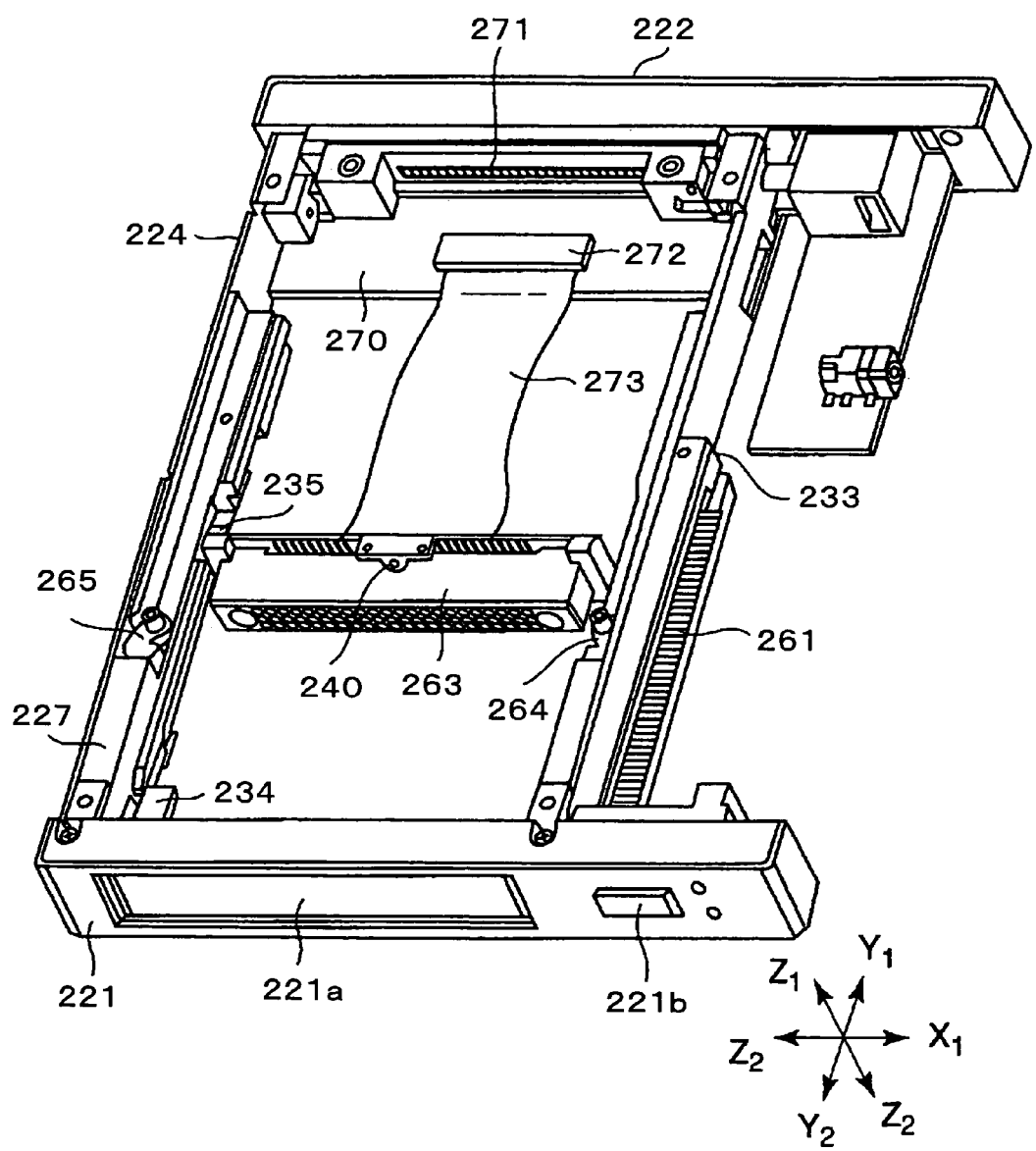
FIG. 19 is a perspective view of the recording medium apparatus under a status where an automatic loading unit is omitted.

FIG. 17 is a plan view of a recording medium apparatus 220 according to the second embodiment. FIG. 18 is a top perspective view of the recording medium apparatus 220. FIG. 19 is a top perspective view of the recording medium apparatus 220 from which an automatic loading unit 40 is removed. In FIG. 17 through FIG. 19, the recording medium apparatus 220 having no loaded recording medium therein is illustrated. Also, the notations $X_1$, $X_2$, $Y_1$, $Y_2$, $Z_1$ and $Z_2$ are designated similarly to the first embodiment. Namely, the insertion direction of the recording medium 10/10A is represented as the notation $Y_1$, and in contrast, the ejection direction of the recording medium 10/10A is represented as the notation $Y_2$. Also, the width, length and height directions of the recording medium 10/10A are represented as notations $X_1X_2$, $Y_1Y_2$ and $Z_1Z_2$, respectively.

Referring to FIG. 17 and FIG. 19, in the recording medium apparatus 220 according to the second embodiment, an automatic loading unit 240, guide rails 226 and 227, and six switches 230 through 235 are mounted to a rectangular frame 225 that is framed by a front bezel 221, a rear-side frame 222 and beam members 223 and 224. The guide rails 226 and 227 are fixed to the inner side of the beam members 223 and 224, respectively.

Figure 20:
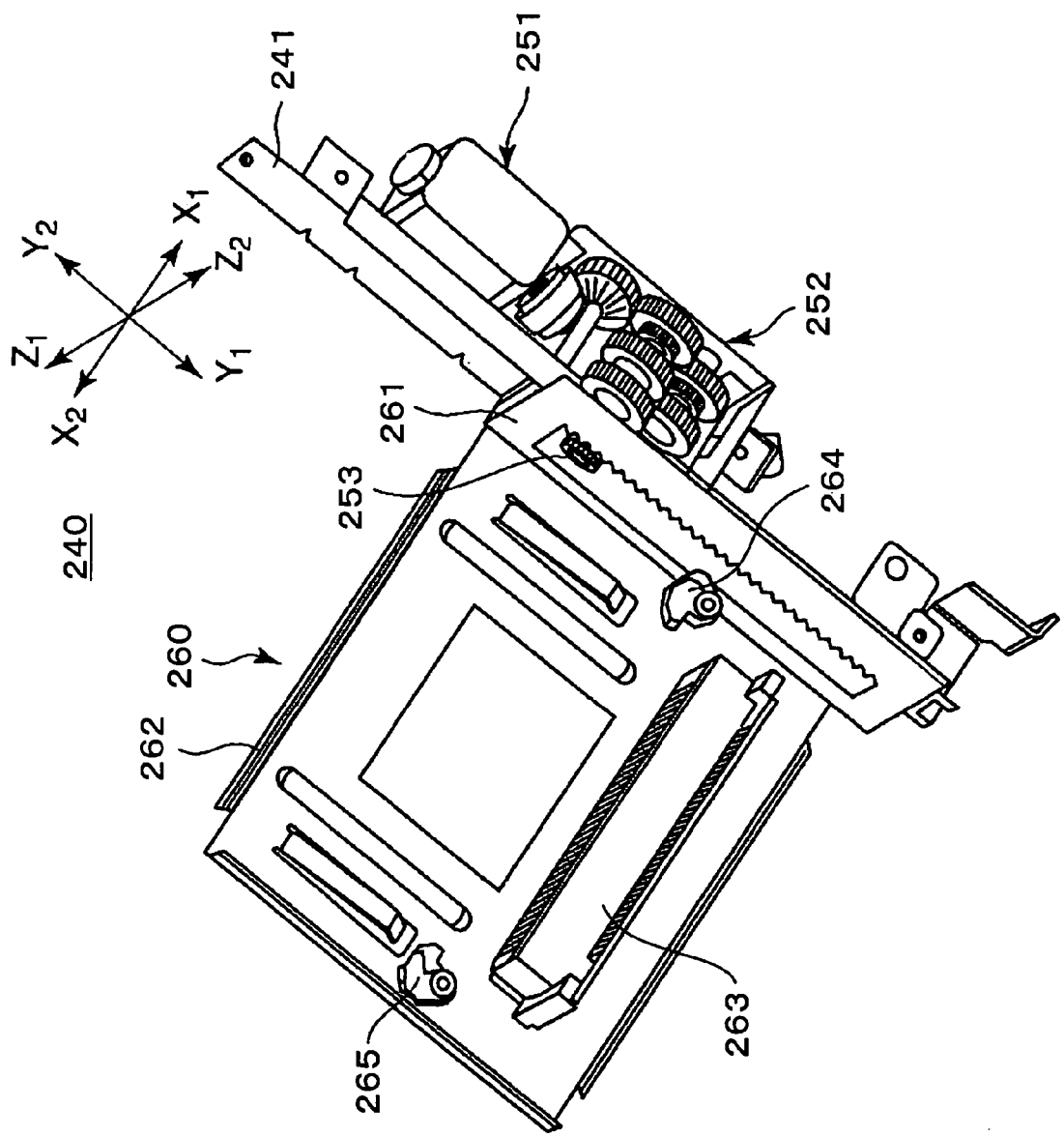
FIG. 20 is a perspective view of the automatic loading unit according to the second embodiment.

FIG. 20 is a perspective view of the automatic loading unit 240 according to the second embodiment.

Referring to FIG. 20, the automatic loading unit 240 includes a beam member 241 having an L-shaped cross section, a motor unit 250 fixed to the $X_1$ side of the beam member 241, and a slide unit 260 that can be slid on the beam member 241 in the $Y_1Y_2$ direction. The motor unit 250 includes a motor 251, a reduction gearbox 252 and a pinion 253. The slide unit 260 includes a rack member 261 supported on an $X_2$-side horizontal portion of the beam member 241, a rectangular support plate member 262 fixed to the rack member 261, a connector member 263 fixed on the bottom surface of the support plate member 262, and hook members 264 and 265. As shown in FIG. 18, the support plate member 262 is provided between the guide rails 26 and 27. As shown in FIG. 19, the connector member 263 is provided in an area between the guide rails 226 and 227, and the hook members 264 and 265 are provided above the guide rails 226 and 227, respectively. The rack member 261, the connector member 263 and the hook members 264 and 265 can be shifted to positions shown in FIG. 21 in the $Y_1$ direction.

Figure 21:
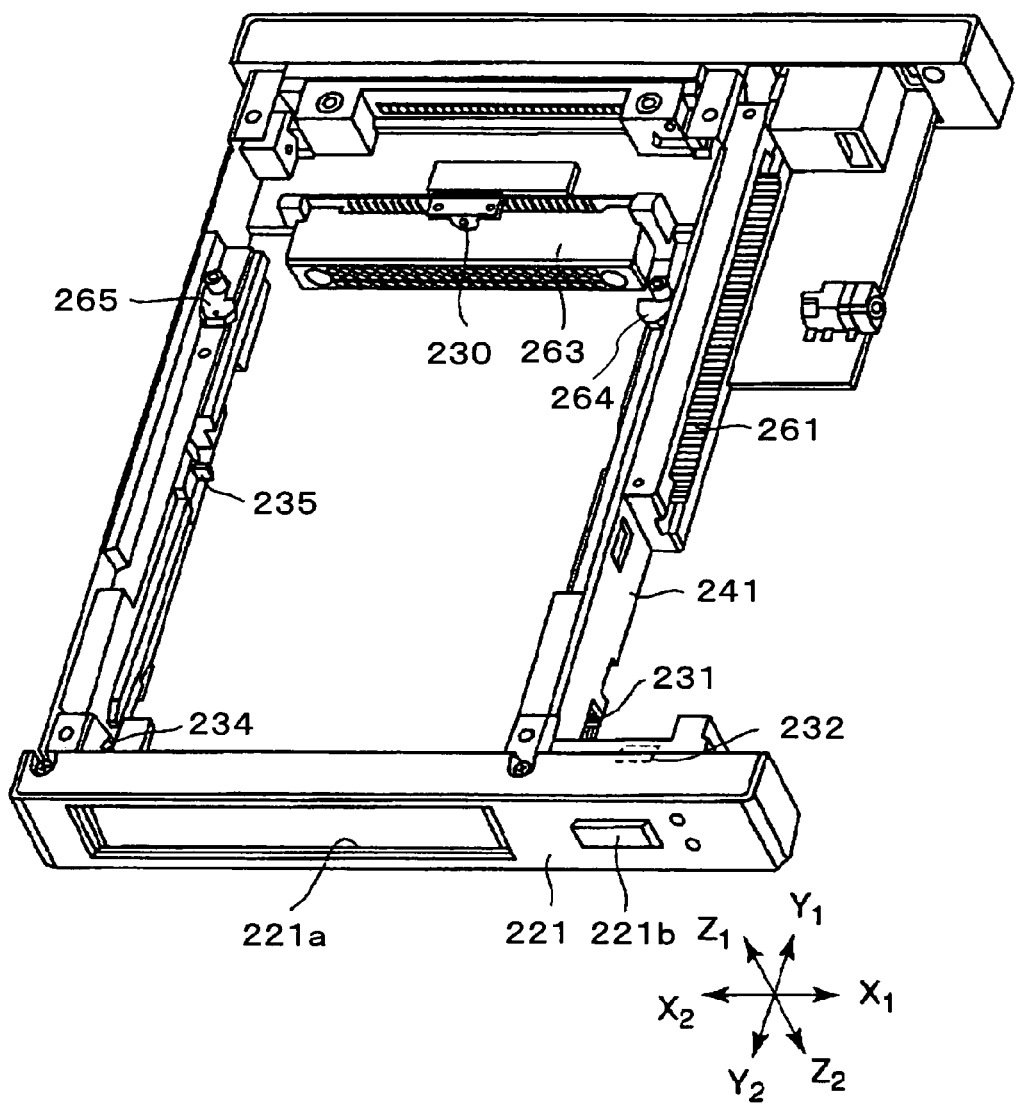
FIG. 21 is a diagram illustrating the recording medium apparatus according to the second embodiment in a status where a connector member is shifted in a $Y_1$ direction.

FIG. 21 is a diagram illustrating the recording medium apparatus 20 in a status where the connector member 263 is shifted in the $Y_1$ direction.

As shown in FIG. 17, FIG. 19 and FIG. 21, an insert switch 230, an insert kill switch 231, an eject switch 232, an eject kill switch 233, an insert stop switch 234 and an eject stop switch 235 are provided in the recording medium apparatus 220.

Figure 22:
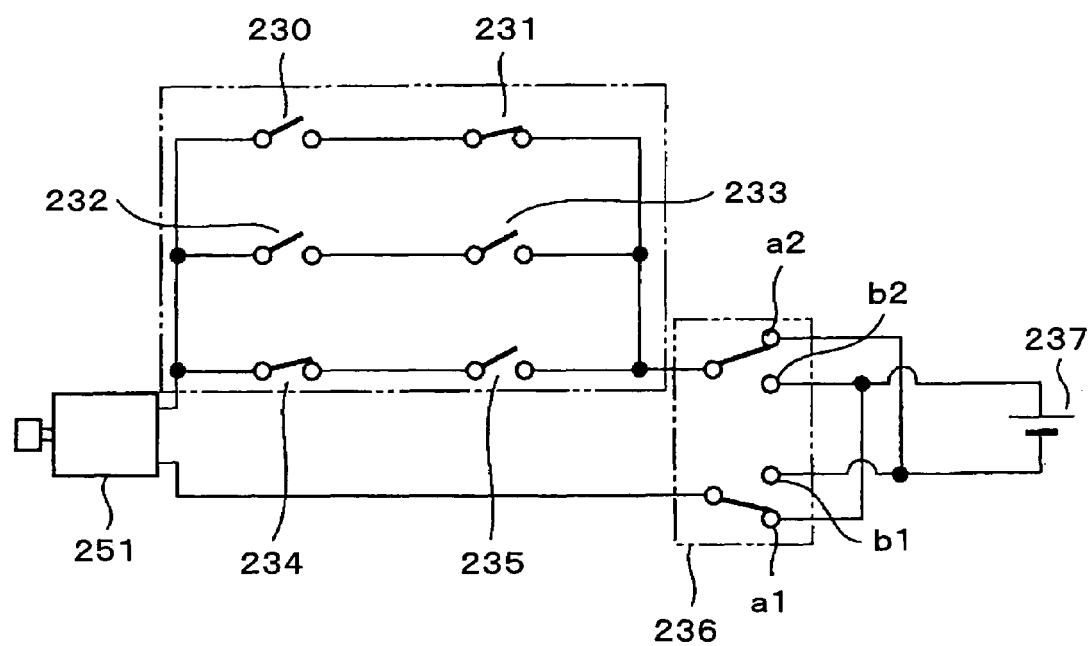
FIG. 22 is an exemplary circuit diagram of a motor drive circuit according to the second embodiment.

FIG. 22 is an exemplary circuit diagram of a motor drive circuit according to the second embodiment.

Referring to FIG. 22, the insert switch 230 and the insert kill switch 231 are connected in series. The eject switch 232 and the eject kill switch 233 are connected in series. The insert stop switch 234 and the eject stop switch 235 are connected in series. Also, these pairs of serially connected switches are connected in parallel, as illustrated in FIG. 22. In the above structure, a switch circuit is configured.

Here, the "kill" switches 231 and 233, which are connected in series to the corresponding switches 230 and 232, can force the motor 251 not to be activated during the kill switches being OFF even if the corresponding switches 230 and 232 are turned ON, respectively. In addition, an inversion switch 236 is provided between the switch circuit and a power supply 237 as an electronic switch on a circuit substrate 270. The insert switch 230 and the eject switch 232 are tactile switches. The kill switches 231 and 233 and the eject stop switch 235 are flat lever switches.

FIGS. 23A and 23B are diagrams illustrating the insert'stop switch 234 according to the second embodiment.

Referring to FIGS. 23A and 23B, the insert stop switch 234 is provided in the vicinity of the front bezel 221. The insert stop switch 234, which is a closed type switch, includes a fixed contact part 234a and a movable contact part 234b. The movable contact part 234b includes a convex part 234b1. The convex part 234b1 is engaged with a guide groove, such as 15X2a and 15X2Aa, of an inserted recording medium, and is used to detect the above-mentioned common dimension part 16, as illustrated in FIG. 23A. Specifically, if the recording medium 10 is loaded, in response to insertion of the recording medium 10 to the final loading position thereof, the convex part 234b1 is pushed in the $X_2$ direction via the common dimension part 16, that is, the end part 15X2a of the guide groove 15X2. On the other hand, if the recording medium 10A is loaded, in response to insertion of the recording medium 10A to the final loading position thereof, the convex part 234b1 is pushed in the $X_2$ direction via the common dimension part 16, that is, the end part 15X2Aa of the guide groove 15X2A.

As shown in FIG. 17 and FIG. 18, the circuit substrate 270 is fixed to the inner side of the rear-side frame 222. The circuit substrate 270 includes connector members 271 and 272 exposed on the back surface of the recording medium apparatus 220. Also, a flexible cable 273 is provided between the connector members 263 and 272.

A description is given, with reference to FIG. 24 through FIG. 27, of load and unload operations on the recording medium 10.

FIGS. 24A through 24H are diagrams illustrating statuses of the switches 230 through 236 and the motor 251 according to the second embodiment.

Before the recording medium 10 is inserted, the recording medium apparatus 220 has the configuration as illustrated in FIG. 17 through FIG. 19. Specifically, the rack member 261, the connector member 263 and the hook members 264 and 265 are positioned at the $Y_2$ side of the recording medium apparatus 220. Also, the reduction gearbox 252 forces the connector member 263 to be fixed. Now, it is supposed that the motor drive circuit is in a circuit status illustrated in FIG. 22. In other words, the switches 230, 232, 233 and 235 are OFF, thereby the motor 251 is not driven. Also, in the inversion switch 236, the movable contact points are connected to the fixed contact points a1 and a2.

A user inserts and pushes the recording medium 10 in a loading slot 221a of the front bezel 221 by pinching the recording medium 10 with user's fingers. Through the insertion, as shown in FIG. 27A, the connector part 13 of the recording medium 10 is connected to the connector member 263.

Figure 25A:
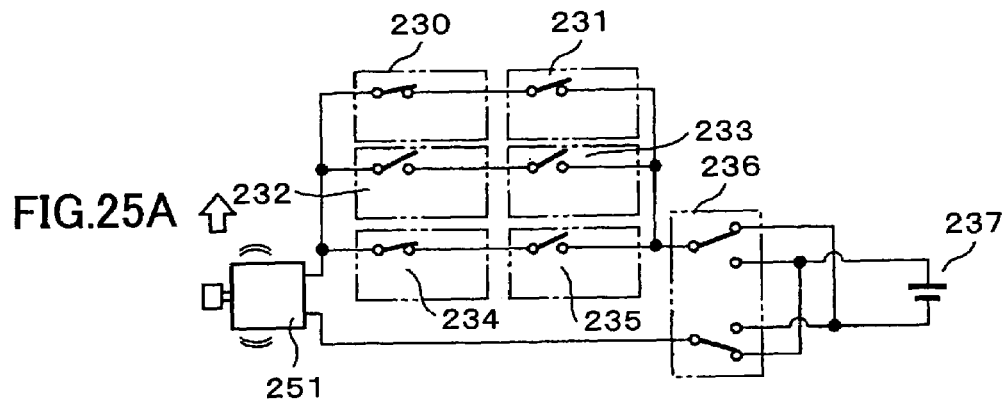
FIGS. 25A through 25C are circuit diagrams illustrating steps of a load operation according to the second embodiment.
Figure 25B:
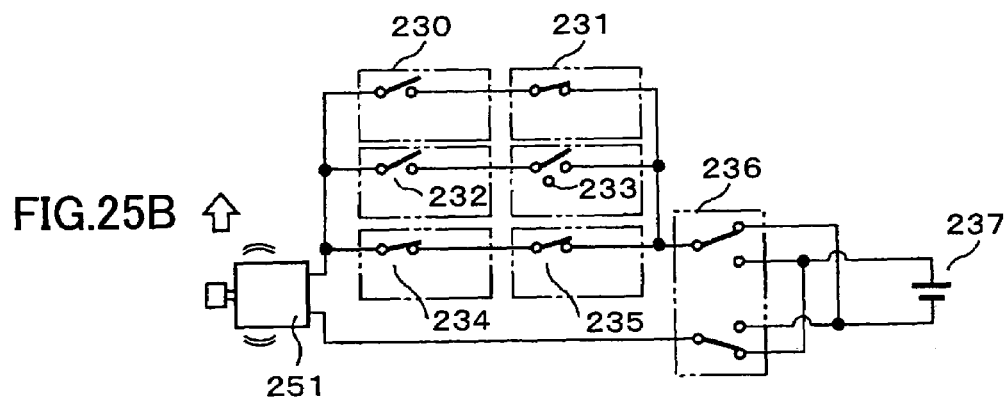
Figure 25C:
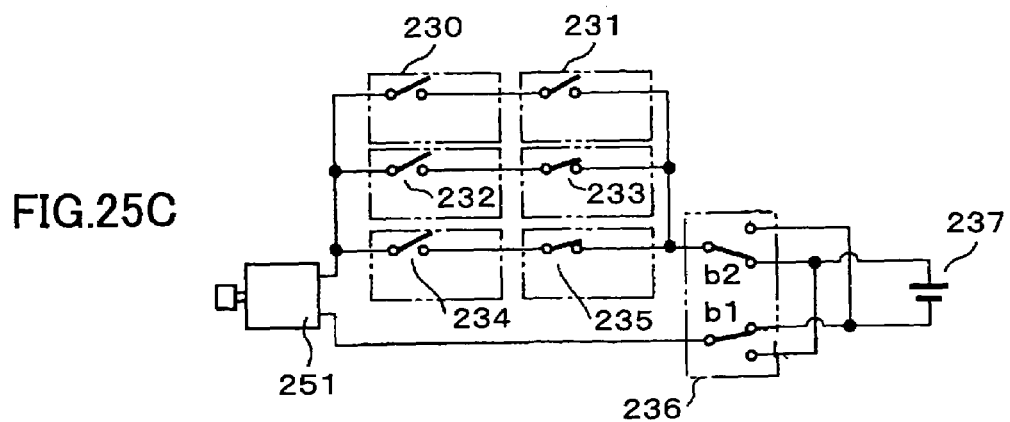

Also, in response to the insertion of the recording medium 10, the switch 230 is temporarily turned ON (FIGS. 24A and 25A), the motor 251 is activated and generates forward rotation (FIG. 24H). In response to the activation of the motor 251, the slide unit 260 starts $Y_1$ directional shift via the reduction gearbox 252, the pinion 253 and the rack member 261. At this time, the hook members 264 and 265 are engaged with the concave parts 17X1 and 17X2, respectively, and thereby the recording medium 10 is pulled in the recording medium apparatus 220. When the slide unit 260 starts the $Y_1$ directional shift, the switch 235 is turned ON (FIGS. 24F and 25B) and thereby the motor 251 continues the forward rotation. When the base part 12 of the recording medium 10 is pulled to a position of filling the loading slot 221a completely, the convex part 234b1 of the movable contact part 234b of the switch 234 is pushed by the end part 15X2a of the guide groove 15X2, and thereby the switch 234 is turned OFF (FIGS. 24E and 25C) and the motor 251 is stopped. Also, the switch 233 is turned ON, and thereby the inversion switch 236 is inverted. As a result, the movable contact points b1 and b2 are in contact with the fixed points a1 and a2 (FIGS. 24G and 25C). In this fashion, the recording medium 10 is loaded in the recording medium apparatus 220, as illustrated in FIG. 27B, and the user can record and reproduce information on the recording medium 10.

Figure 26A:
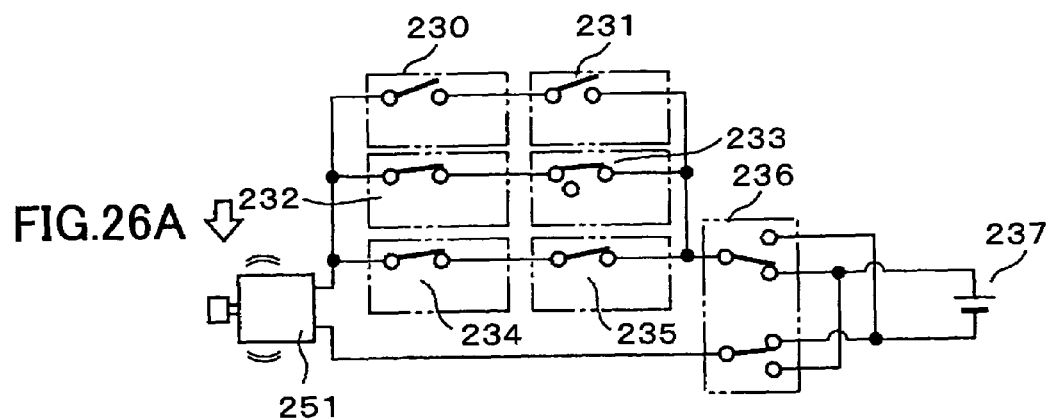
FIGS. 26A and 26B are circuit diagrams illustrating steps of an unload operation according to the second embodiment.
Figure 26B:
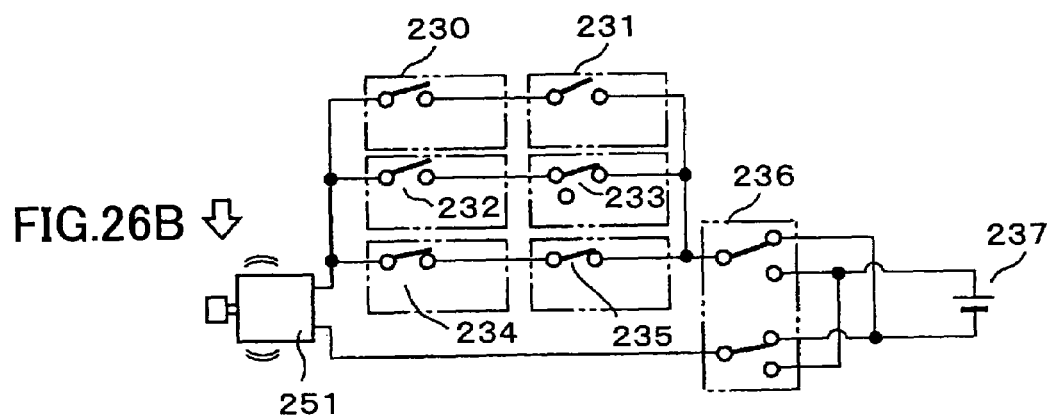

On the other hand, in order to unload the recording medium 10, when the user pushes the eject button 221b, the switch 232 is temporarily turned OFF (FIGS. 24C and 26A) and the motor 251 starts reverse rotation (FIG. 24H). In response to the activation of the motor 251, the slide unit 260 starts $Y_2$ directional shift together with the recording medium 10. In response to the start of the $Y_2$ directional shift, the convex part 234b1 is engaged with the guide groove 15X2, and thereby the switch 234 is turned ON (FIGS. 24E and 26B). At this time, the motor 251 continues the reverse rotation, and the recording medium 10 is ejected from the recording medium apparatus 220. Then, when the connector member 263 is shifted back to the original position thereof, the hook members 264 and 265 are released from the concave parts 17X1 and 17X2, respectively. As a result, the switches 233 and 235 are turned OFF (FIGS. 24D and 24F), and thereby the motor 251 is stopped. At this time, the recording medium 10 is unloaded as illustrated in FIG. 27A, and the unload operation on the recording medium 10 is finished. Also, the inversion switch 236 is switched.

After the unload operation, the user can disconnect the connector part 13 from the connector member 263 and fetch the recording medium 10 by pulling out the recording medium 10 protruded from the front bezel 221.

A description is given, with reference to FIGS. 28A and 28B, of load and unload operations on the recording medium 10A.

FIGS. 28A and 28B are diagrams illustrating the recording medium 10A and the recording medium apparatus 220 before and after a load operation, respectively.

In order to load the recording medium 10A in the recording medium apparatus 220, when a user inserts and pushes the recording medium in the loading slot 221a of the front bezel 221 by pinching the side of the base part 12A, the connector part 13 of the recording medium 10A is connected to the connector member 263.

In subsequent operation, like the loading of the recording medium 10, the motor 251 is activated and generates forward rotation. In response to the activation of the motor 251, the slide unit 260 starts $Y_1$ directional shift. Then, the hook members 264 and 265 are engaged with the concave parts 17X1A and 17X2A, respectively, and the recording medium 10A is pulled in the recording medium apparatus 220. When the base part 12A of the recording medium 10A is pulled to a position of filling the loading slot 221a completely, the convex part 234b1 of the movable contact part 234b of the switch 234 is pushed by the end part 15X2Aa of the guide groove 15XA2, and thereby the switch 234 is turned OFF and the motor 251 is stopped. In this fashion, the recording medium 10A is loaded in the recording medium apparatus 220, as illustrated in FIG. 28B, and the user can record and reproduce information on the recording medium 10A.

On the other hand, in order to unload the recording medium 10A, like the unloading of the recording medium 10A, when the user pushes the eject button 221b, the motor 251 starts reverse rotation. In response to the activation of the motor 251, the slide unit 260 starts $Y_2$ directional shift together with the recording medium 10. In response to the start of the $Y_2$ directional shift, the convex part 234b1 is engaged with the guide groove 15X2A, and thereby the switch 234 is turned ON. Then, when the connector member 263 is shifted back to the original position thereof, the hook members 264 and 265 are released from the concave parts 17X1A and 17X2A, respectively. As a result, the switches 233 and 235 are turned OFF and thereby the motor 251 is stopped. At this time, the recording medium 10A is unloaded as illustrated in FIG. 28A, and the unload operation on the recording medium 10A is finished. After the unload operation, the user can disconnect the connector part 13 from the connector member 263 and fetch the recording medium 10A by pulling out the recording medium 10A protruded from the front bezel 221.

As mentioned above, when a recording medium 10 or 10A is loaded in the recording medium apparatus 220, stop timing of the motor 251 is determined based on the common dimension part 16 of the recording medium 10 or 10A, that is, the end parts 15X2a or 15X2Aa of the guide groove 15X2 or 15X2A according to the second embodiment of the present invention. For this reason, the recording medium apparatus 220 can be easily configured without determination means for determining which type of recording media is being inserted.

According to the second embodiment, it is possible to provide a recording medium apparatus that can electrically and automatically load and unload a plurality of type of recording media having different lengths with respect to the insertion direction thereof.

The present invention is not limited to the specifically disclosed embodiments, and variations and modifications may be made without departing from the scope of the present invention.

The present application is based on Japanese priority applications No. 2003-088705 and No. 2003-088706 filed Mar. 27, 2003, the entire contents of which are hereby incorporated by reference.

What is claimed is:

1. A recording medium apparatus for loading a recording medium having a terminal at a front edge side thereof with respect to an insertion direction wherein the recording medium is loaded by inserting the recording medium toward a loading position under a status where the terminal is connected to a connector of the recording medium apparatus, comprising:
   a slider connector unit having the connector, said slider connector unit being shifted by pushing of the recording medium;
   a slider unit, when the recording medium reaches a predefined position within the recording medium apparatus, being pushed and shifted by a portion of the recording medium, said portion being at a side opposite to the insertion direction;
   a slider connector unit lock part locking the slider connector unit, said slider connector unit lock part, when the terminal of the recording medium is connected to the connector, unlocking the slider connector unit;
   a slider unit lock part locking the shifted slider unit, said slider unit lock part, in response to an eject operation, unlocking the slider unit; and
   a spring member being elastically deformed by shifting of the slider unit, thereby said spring member applying an ejection force to the recording medium via the slider unit.

2. A recording medium apparatus for loading a plurality of types of recording media wherein each of the recording media has a terminal at a front edge side thereof with respect to an insertion direction and a common dimension part configured to have an equal dimension at a side opposite to the insertion direction, and the recording medium is loaded by inserting the recording medium toward a loading position under a status where the terminal is connected to a connector of the recording medium apparatus, comprising:
   a lock part locking the recording medium at the loading position, said lock part, in response to an eject operation, unlocking the recording medium,
   wherein the lock part operates based on the common dimension part.

3. The recording medium apparatus as claimed in claim 2, wherein each of the plurality of types of recording media comprises a guide groove formed on a side surface thereof, the guide groove extending from the front edge side with respect to the insertion direction to a position opposite to the insertion direction, the common dimension part is positioned at an end portion of the guide groove, and the lock part is activated by the end portion of the guide groove.

4. The recording medium apparatus as claimed in claim 2, further comprising:
   a spring member being elastically deformed by inserting of each of the plurality of types of recording media toward the loading position thereof, thereby said spring member applying an ejection force to the recording medium.

5. A recording medium apparatus for loading a recording medium having a terminal at a front edge side thereof with respect to an insertion direction, comprising:
   a connector connectable to the terminal of the recording medium;
   a recording medium load part shifting and loading the recording medium connected to the connector by using a motor; and
   an operation stop part, when a portion opposite to an insertion direction of the recording medium reaches a predefined position regardless of a length of the recording medium with respect to the insertion direction, stopping an operation of the recording medium load part.

6. A recording medium apparatus for loading a plurality of types of recording media wherein each of the recording media has a terminal at a front edge side thereof with respect to an insertion direction and a common dimension part configured to have an equal dimension at a side opposite to the insertion direction, comprising:
   a connector connectable to the terminal of the recording medium;
   a recording medium load part shifting and loading the recording medium connected to the connector by using a motor; and
   an operation stop part detecting the common dimension part of the recording medium and stopping an operation of the recording medium load part.

7. The recording medium apparatus as claimed in claim 6, wherein the operation stop part is a switch operable in response to pushing of the common dimension part of the recording medium.

8. The recording medium apparatus as claimed in claim 6, wherein each of the plurality of types of recording media comprises a guide groove formed on a side surface thereof, the guide groove extending from the front edge side with respect to the insertion direction to a position opposite to the insertion direction, the common dimension part is positioned at an end side of the guide groove, the operation stop part is configured as a switch including a movable contact part engaged with the guide groove, and the switch is not pushed during engagement with the guide groove and is operated in response to pushing of an end part of the guide groove.

* * * * *